US011009607B2

United States Patent
Nishita

(10) Patent No.: US 11,009,607 B2
(45) Date of Patent: May 18, 2021

(54) SURVEYING SYSTEM

(71) Applicant: TOPCON Corporation, Tokyo-to (JP)

(72) Inventor: Nobuyuki Nishita, Tokyo-to (JP)

(73) Assignee: TOPCON Corporation, Tokyo-to (JP)

( * ) Notice: Subject to any disclaimer, the term of this patent is extended or adjusted under 35 U.S.C. 154(b) by 338 days.

(21) Appl. No.: 16/013,455

(22) Filed: Jun. 20, 2018

(65) Prior Publication Data

US 2019/0018142 A1 Jan. 17, 2019

(30) Foreign Application Priority Data

Jul. 14, 2017 (JP) .............................. JP2017-137832

(51) Int. Cl.
G01S 17/42 (2006.01)
G01C 3/08 (2006.01)
G01C 15/00 (2006.01)
G01C 15/06 (2006.01)
G01S 7/48 (2006.01)
G01S 7/481 (2006.01)

(52) U.S. Cl.
CPC .............. *G01S 17/42* (2013.01); *G01C 3/08* (2013.01); *G01C 15/002* (2013.01); *G01C 15/06* (2013.01); *G01S 7/4804* (2013.01); *G01S 7/4817* (2013.01)

(58) Field of Classification Search
CPC .......... G01C 15/002; G01C 1/02; G01C 3/08; G01C 1/04; G01C 15/00; G01S 17/08; G01S 17/89; G01S 17/87
See application file for complete search history.

(56) References Cited

U.S. PATENT DOCUMENTS

| 8,567,076 | B2 | 10/2013 | Ortleb et al. |
| 2012/0272536 | A1 | 11/2012 | Nishita |
| 2015/0042977 | A1 | 2/2015 | Siercks et al. |
| 2016/0131479 | A1* | 5/2016 | Kumagai ............... G01C 15/06 33/290 |
| 2016/0349051 | A1* | 12/2016 | Kumagai ............... G01S 17/42 |

FOREIGN PATENT DOCUMENTS

| JP | 2012-233769 A | 11/2012 |
| WO | 2015/191314 A1 | 12/2015 |

OTHER PUBLICATIONS

European communication dated Nov. 26, 2018 in corresponding European patent application No. 18182503.5.

* cited by examiner

Primary Examiner — Luke D Ratcliffe
(74) Attorney, Agent, or Firm — Nields, Lemack & Frame, LLC

(57) ABSTRACT

A first surveying unit comprises a frame in a horizontally rotatable manner, a telescope unit in a vertically rotatable manner, a first angle measuring unit and a first distance measuring unit which measure a prism, wherein the second surveying unit comprises a scanning mirror which rotatably irradiates a laser beam and a second angle measuring unit which detects a rotation angle of the scanning mirror, wherein a target instrument comprises a pole installed at a measuring point, the prism has a known positional relationship with a lower end of the pole, and a target plate mounted on the pole, wherein an arithmetic control module scans a laser beam, calculates a measuring point direction vector based on point cloud data of the target plate, and calculates a three-dimensional coordinate of the measuring point based on an optical center of the prism, the measuring point direction vector, and the positional relationship.

16 Claims, 18 Drawing Sheets

SURVEYING SYSTEM

BACKGROUND OF THE INVENTION

The present invention relates to a surveying system which installs a retro-reflector at a measuring point, performs a distance measurement on the retro-reflector and calculates a three-dimensional coordinate of the measuring point.

In general, when performing a survey of desired measuring points, surveying operation is carried out by using a prism and the like having retro-reflectivity. Since the prism has a size, an optical reflecting point of the prism cannot be directly installed at the measuring point.

Therefore, in the survey using the prism, the prism is provided at a known position from a lower end of a tripod or a pole, the tripod or the pole is installed at the measuring point, after an adjustment is made so that the prism is positioned on a vertical line of the measuring point by using a bubble tube, the prism is measured.

However, in a case where a corner of a room is set as the measuring point or the like, the pole cannot be adjusted to be vertical since the prism hits a wall surface or the like. In a case where the prism cannot be installed on the vertical line of the measuring point, a surveying operation using the prism cannot be carried out.

SUMMARY OF THE INVENTION

It is an object of the present invention to provide a surveying system capable of performing a prism surveying even in a case where the prism cannot be installed on the vertical line of the measuring point.

To attain the object as described above, a surveying system according to the present invention has a surveying instrument comprising a first surveying unit which projects a distance measuring light and measures a prism, a second surveying unit provided integrally with the first surveying unit, and an arithmetic control module, and target instrument installed at a measuring point, wherein the first surveying unit comprises a frame in a horizontally rotatable manner, a telescope unit provided on the frame in a vertically rotatable manner, a first angle measuring unit which detects a horizontal angle of the frame and a vertical angle of the telescope unit, and a first distance measuring unit which is accommodated in the telescope unit and measures a distance to the prism, wherein the second surveying unit comprises a scanning mirror which rotatably irradiates a laser beam to one axis in a vertical direction or a horizontal direction and a second angle measuring unit which detects a vertical angle of the scanning mirror, wherein the target instrument comprises a pole, the prism provided on an axis of the pole and has a known positional relationship with a lower end of the pole, and a target plate mounted on the pole, wherein the arithmetic control module scans a laser beam by a cooperative operation of the horizontal rotation of the frame or the vertical rotation of the telescope unit and the vertical rotation or the horizontal rotation of the scanning mirror, acquires point cloud data of the target plate, calculates a measuring point direction vector indicating a tilt direction of the pole based on a measurement result of a surface of the target plate obtained from the point cloud data, and calculates a three-dimensional coordinate of the measuring point based on the three-dimensional coordinate of an optical center of the prism measured by the first measuring unit, the measuring point direction vector, and the positional relationship between the optical center of the prism and the lower end of the pole.

Further, in the surveying system according to a preferred embodiment, the second surveying unit is provided on the frame and rotatably irradiates the laser beam to a vertical direction by the rotation of the scanning mirror.

Further, in the surveying system according to the preferred embodiment, the second surveying unit is provided on the telescope unit and rotatably irradiates the laser beam to the horizontal direction by the rotation of the scanning mirror.

Further, in the surveying system according to the preferred embodiment, the target plate has a plate-like shape, the target plate has a tilt detecting pattern extending in a direction orthogonal to the axis of the pole from one side end to an other side end, the arithmetic control module calculates a vector orthogonal to a normal vector calculated based on the measurement result of the surface of the target plate and a tilt direction vector calculated based on an edge detection of the tilt detecting pattern, respectively, and passing through the optical center of the prism as the measuring point direction vector.

Further, in the surveying system according to the preferred embodiment, the target plate has a triangular prism shape having a triangular lateral cross-section, the prism is provided on a ridge line formed by adjacent two surfaces crossing each other, the arithmetic control module calculates a ridge line vector and a normal vector of each surface based on the measurement result of the two surfaces, calculates an average normal vector based on the each normal vector, and calculates a vector orthogonal to the average normal vector and the ridge line vector, respectively, and passing through the optical center of the prism as the measuring point direction vector.

Further, in the surveying system according to the preferred embodiment, the target plate is two or more plate materials provided at an equal angular interval radially on the pole, the prism is an omnidirectional prism provided on an upper end of the target plate, and the arithmetic control module calculates a ridge line formed by the two surfaces crossing each other based on the measurement results of the adjacent two surfaces of the target plate as the measuring point direction vector.

Further, in the surveying system according to the preferred embodiment, an optical axis of the second surveying unit is offset in a horizontal direction with respect to an optical axis of the first distance measuring unit, the target plate has a triangular prism shape having a triangular lateral cross-section, the prism is provided on a ridge line formed by the adjacent two surfaces crossing each other, the arithmetic control module detects three edges of an upper end and a lower end and the ridge line of the adjacent two surfaces based on one row of point cloud data, detects the adjacent two surfaces based on the three edges and the measurement result of the prism by the first surveying unit, calculates a ridge line vector and a normal vector of each surface based on the measurement result of the adjacent two surfaces, calculates an average normal vector based on the each normal vector, and calculates a vector orthogonal to the average normal vector and the ridge line vector, respectively, and passing through the prism as the measuring point direction vector.

Furthermore, in the surveying system according to the preferred embodiment, a positional relationship between the lower end of the pole and the prism is already known, an electronic distance meter having a same optical axis as the axis of the pole is provided, the arithmetic control module calculates a three-dimensional coordinate of the measuring point based on the measurement result of the prism by the first surveying unit, the measuring point direction vector, the positional relationship between the prism and the electronic distance meter, and the distance measurement result of the electronic distance meter.

According to the present invention, the surveying system has a surveying instrument comprising a first surveying unit which projects a distance measuring light and measures a prism, a second surveying unit provided integrally with the first surveying unit, and an arithmetic control module, and a target instrument installed at a measuring point, wherein the first surveying unit comprises a frame in a horizontally rotatable manner, a telescope unit provided on the frame in a vertically rotatable manner, a first angle measuring unit which detects a horizontal angle of the frame and a vertical angle of the telescope unit, and a first distance measuring unit which is accommodated in the telescope unit and measures a distance to the prism, wherein the second surveying unit comprises a scanning mirror which rotatably irradiates a laser beam to one axis in a vertical direction or horizontal direction and a second angle measuring unit which detects a vertical angle of the scanning mirror, wherein the target instrument comprises a pole, the prism provided on an axis of the pole and has a known positional relationship with a lower end of the pole, and a target plate mounted on the pole, wherein the arithmetic control module scans a laser beam by a cooperative operation of the horizontal rotation of the frame or the vertical rotation of the telescope unit and the vertical rotation or the horizontal rotation of the scanning mirror, acquires point cloud data of the target plate, calculates a measuring point direction vector indicating a tilt direction of the pole based on a measurement result of a surface of the target plate obtained from the point cloud data, and calculates a three-dimensional coordinate of the measuring point based on the three-dimensional coordinate of an optical center of the prism measured by the first measuring unit, the measuring point direction vector, and the positional relationship between the optical center of the prism and the lower end of the pole. As a result, there is no need to level the target instrument vertically on the measuring point or to arrange the prism on the measuring point, a working time can be reduced and a working efficiency can be improved.

DETAILED DESCRIPTION OF THE PREFERRED EMBODIMENT

Figure 1:
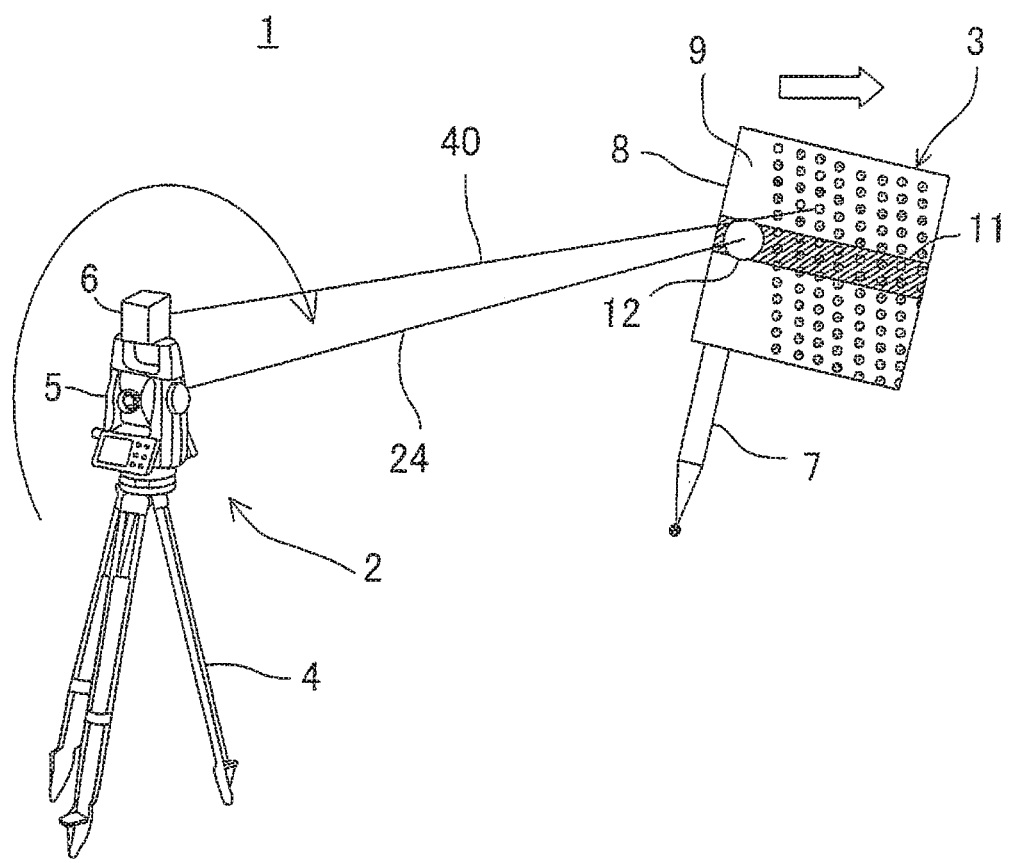
FIG. 1 is a perspective view to show a surveying system according to a first embodiment of the present invention.

A description will be given below on an embodiment of the present invention by referring to the attached drawings.

First, by referring to FIG. 1, a description will be given on a surveying system according to a first embodiment of the present invention.

A surveying system 1 has a surveying instrument 2 and a target instrument 3. The surveying instrument 2 has a first surveying unit 5 provided on a tripod 4 and a second surveying unit 6 provided on the first surveying unit 5 integrally with the first surveying unit 5. The first surveying unit 5 is a total station, for instance. The second surveying unit 6 is a uniaxial laser scanner which performs a rotational scan in a vertical direction with one axis, for instance. It is to be noted that the second surveying unit 6 may be provided on a side surface of the first surveying unit 5.

The target instrument 3 has a pole 7 with a conical lower end portion and a target plate 8 mounted on an upper end of the pole 7. The target plate 8 is a rectangular plate material, for instance, and a surface is painted by a color with high reflectance such as a white paint, for instance, or a reflection sheet is bonded. A reflection surface 9 is formed by the paint or the reflection sheet.

Further, on the surface of the target plate 8, a band-like tilt detecting pattern 11 is formed by a color with low reflectance such as a black paint, for instance. The tilt detecting pattern 11 has a known width, extends from one side end to an other side end of the target plate 8, and a center line of the tilt detecting pattern 11 is configured to be orthogonal to an axis of the pole 7. That is, in a case where the axis of the pole 7 is vertical, the center line of the tilt detecting pattern 11 becomes horizontal.

Further, on the target plate 8, a target having retro-reflectivity such as a prism 12, for instance, is provided. An optical center of the prism 12 is positioned on the axis of the pole 7 and positioned on the center line of the tilt detecting pattern 11. A distance between the optical center of the prism 12 and the lower end of the pole 7 is already known.

Figure 2:
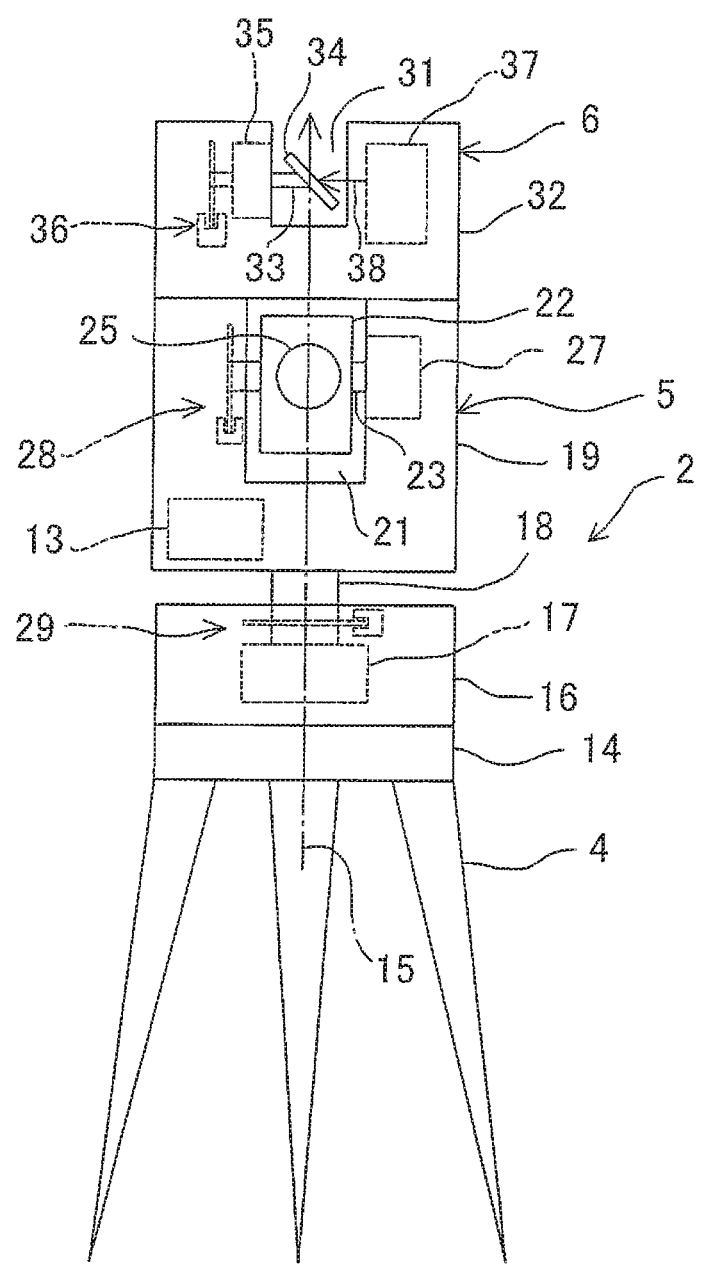
FIG. 2 is a front view to show a surveying instrument of the surveying system according to the first embodiment of the present invention.

Next, by referring to FIG. 2, a description will be given on an approximate arrangement of the surveying instrument 2.

The surveying instrument 2 includes the first surveying unit 5 which is a total station, the second surveying unit 6 which is a two-dimensional laser scanner which performs a rotational scan with one axis, and an arithmetic control module 13. The arithmetic control module 13 integrally controls an operation of the first surveying unit 5 and an operation of the second surveying unit 6, and also performs a matching between data obtained by the first surveying unit 5 and the second surveying unit 6 and a data processing such as a correction and the like. It is to be noted that the arithmetic control module 13 may be served by either one of a first arithmetic control module 48 (to be described later) provided on the first surveying unit 5 or a second arithmetic control module 52 (to be described later) provided on the second surveying unit 6. Alternatively, the arithmetic control module 13 may integrally control the first arithmetic control module 48 and the second arithmetic control module 52.

A leveling unit 14 is provided on the tripod 4, the first surveying unit 5 is provided on the leveling unit 14, and the second surveying unit 6 is provided on an upper surface of the first surveying unit 5.

The first surveying unit 5 has a first mechanical reference point (not shown). The first surveying unit 5 and the second surveying unit 6 are constituted in such a manner that a second mechanical reference point (not shown) of the second surveying unit 6 exists on a vertical line 15 passing through the first mechanical reference point.

A lower end portion of the first surveying unit 5 is a base unit 16, and the base unit 16 is mounted on the leveling unit 14. A horizontal rotation driving unit 17 is accommodated in the base unit 16, and the horizontal rotation driving unit 17 has a horizontal rotation shaft 18 extending vertically. The horizontal rotation shaft 18 is provided rotatably on the base unit 16, and an axis of the horizontal rotation shaft 18 coincides with the vertical line 15.

A frame 19 which is a horizontal rotation unit is mounted on an upper end of the horizontal rotation shaft 18. The second surveying unit 6 is provided on an upper surface of the frame 19.

The frame 19 has a recessed portion 21, and a telescope unit 22 which is a vertical rotation unit is accommodated in the recessed portion 21. The telescope unit 22 is rotatably supported by the frame 19 in the vertical direction via a vertical rotation shaft 23 having a horizontal axis.

On the telescope unit 22, a telescope (a lens unit) 25 having a first distance measuring optical axis 24 (see FIG. 1) is provided, and a first distance measuring unit 26 (to be described later) which functions as a first electronic distance meter and the like are accommodated in the telescope unit 22. The first distance measuring optical axis 24 crosses the vertical line 15 and is also orthogonal to an axis of the vertical rotation shaft 23. An intersection point between the first distance measuring optical axis 24 and the axis of the vertical rotation shaft 23 may be set as a first mechanical reference point.

A vertical rotation driving unit 27 is accommodated in the frame 19, and the vertical rotation driving unit 27 is connected to the vertical rotation shaft 23. The telescope unit 22 is rotated in a vertical direction by the vertical rotation driving unit 27 via the vertical rotation shaft 23. A first vertical angle detector 28 is provided on the vertical rotation shaft 23. By the first vertical angle detector 28, a vertical rotation angle of the vertical rotation shaft 23 is detected in real time, and further, a vertical angle of the telescope unit 22 is detected. As the first vertical angle detector 28, an encoder, for instance, may be used.

The frame 19 is rotated over total circumference in a horizontal direction by the horizontal rotation driving unit 17 via the horizontal rotation shaft 18. Further, a horizontal angle detector 29 is provided on the horizontal rotation shaft 18. A horizontal rotation angle of the frame 19 is detected by the horizontal angle detector 29, and further, a horizontal angle (a horizontal angle of the telescope unit 22) of the frame 19 is detected in real time. As the horizontal angle detector 29, an encoder, for instance, may be used.

A rotation driving unit is constituted by the horizontal rotation driving unit 17 and the vertical rotation driving unit 27, and the telescope unit 22 is rotated by the rotation driving unit in a required condition in two directions, i.e. a vertical direction and a horizontal direction. Further, the first vertical angle detector 28 and the horizontal angle detector 29 constitute a direction angle detector and configured so as to detect a vertical angle and a horizontal angle (that is, a horizontal angle of the telescope unit 22) of the first distance measuring optical axis 24 in real time.

Further, by the arithmetic control module 13, the first distance measuring unit 26, the horizontal rotation driving unit 17, the vertical rotation driving unit 27 and the like are controlled.

Next, by referring to FIG. 2, a description will be given on an appropriate arrangement of the second measuring unit 6.

The second surveying unit b has a housing 32 in which a recessed portion 31 is formed at a central portion, and the housing 32 is fixed to the upper surface of the frame 19.

In the housing 32, a scanning rotation shaft 33 with a horizontal axis is rotatably provided. One end portion of the scanning rotation shaft 33 protrudes to the recessed portion 31, and a scanning mirror 34 is fixed to a forward end of the one end portion. The scanning mirror 34 is provided at an angle of 45° with respect to the axis of the scanning rotation shaft 33. A scanning motor 35 is accommodated inside the housing 32, and the scanning motor 35 is connected to the scanning rotation shaft 33. In a manner that the scanning motor 35 rotates the scanning rotation shaft 33, the scanning mirror 34 is designed so as to be rotated.

Further, on the other end portion of the scanning rotation shaft 33, a second vertical angle detector 36 is provided. The second vertical angle detector 36 is designed so as to detect a rotation angle (a vertical angle, that is, a rotation angle of the scanning mirror 34) of the scanning rotation shaft 33 in real time. It is to be noted that, as the second vertical angle detector 36, an encoder may be used.

A second distance measuring unit 37 which functions as a second electronic distance meter is accommodated in the housing 32 and provided at a part faced with the scanning mirror 34. The second distance measuring unit 37 emits a second distance measuring light (a pulsed laser beam) 38 toward the scanning mirror 34.

A second distance measuring optical axis 40 (see FIG. 1) of the second distance measuring light 38 coincides with the axis of the scanning rotation shaft 33 and is deflected at a right angle by the scanning mirror 34. By rotating the scanning mirror 34 around the scanning rotation shaft 33, the second distance measuring light 38 deflected by the scanning mirror 34 is arranged to be rotatably irradiated in a vertical surface.

An intersection point between the axis of the scanning rotation shaft 33 (that is, the optical axis of the second distance measuring light 38) and the scanning mirror 34 is set as a second mechanical reference point of the second surveying unit 6. A vertical line passing through the second mechanical reference point is set so as to coincide with the vertical line 15.

Therefore, as described above, the first mechanical reference point of the first surveying unit 5 and the second mechanical reference point of the second surveying unit 6 exist on the same vertical line 15. Further, a distance between the first mechanical reference point and the second mechanical reference point is already known.

The second distance measuring light 38 as rotatably irradiated scans an object to be measured, and a reflected second distance measuring light 38' (not shown) as reflected by the object to be measured enters the second distance measuring unit 37 via the scanning mirror 34. The second distance measuring unit 37 receives the reflected second distance measuring light 38', obtains a reciprocating time of a pulsed light, and performs a distance measurement for each pulsed light (Time of Flight) based on the reciprocating time and a light velocity.

Further, as described above, a vertical angle of the scanning mirror 34 is detected by the second vertical angle detector 36 in real time, and the distance measurement is performed for each pulsed light, and the vertical angle is detected for each pulsed light.

The second surveying unit 6 rotatably irradiates the second distance measuring light 38 in the vertical direction and detects the vertical angle. As a result, the second surveying unit 6 acquires two-dimensional point cloud data having two-dimensional coordinates of the distance and the vertical angle.

By referring to FIG. 3, a further description will be given on the first surveying unit 5 and the second surveying unit 6.

Figure 3:
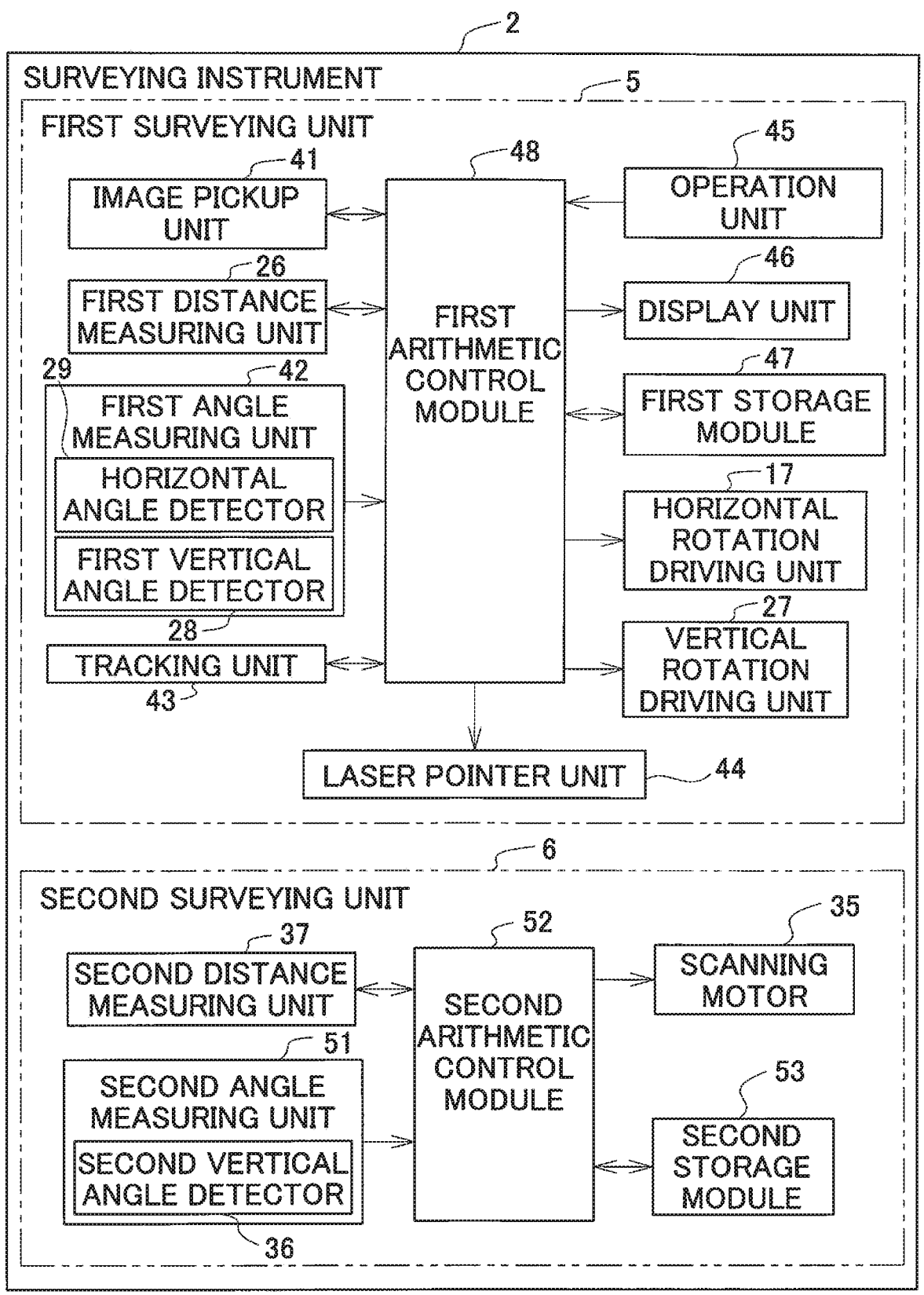
FIG. 3 is a schematical block diagram of the surveying instrument according to the first embodiment of the present invention.
Figure 4:
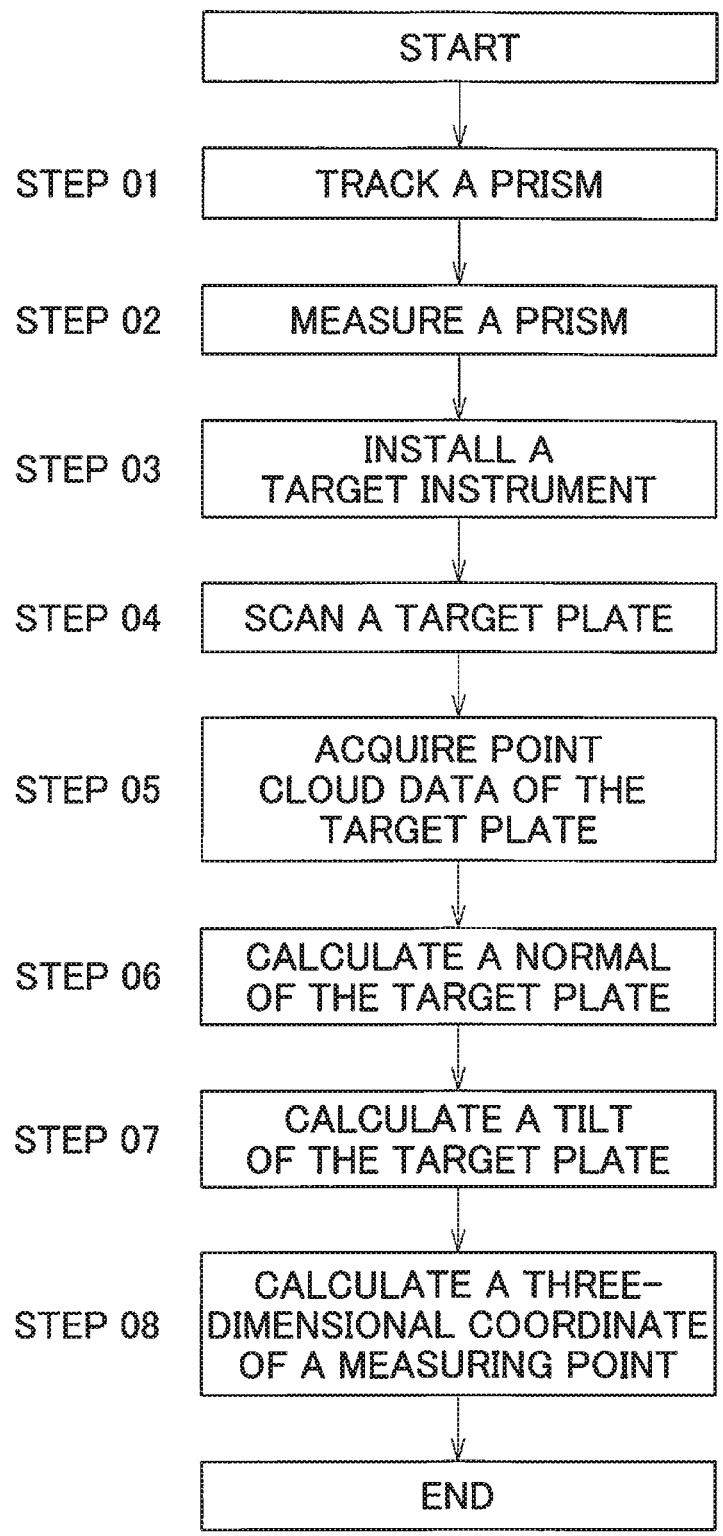
FIG. 4 is a flowchart to explain a prism surveying using the surveying system according to the first embodiment of the present invention.

As shown in FIG. 3, the first surveying unit 5 is primarily constituted by an image pickup unit 41, the first distance measuring unit 26, a first angle measuring unit 42, a tracking unit 43, a laser pointer unit 44, an operation unit 45, a display unit 46, a first storage module 47, a first arithmetic control module 48, the horizontal rotation driving unit 17, and the vertical rotation driving unit 27.

It is to be noted that the first angle measuring unit 42 is constituted by the horizontal angle detector 29 and the first vertical angle detector 28. As the horizontal angle detector 29 and the first vertical angle detector 28, an encoder may be used.

The first distance measuring unit 26 emits a first distance measuring light on the first distance measuring optical axis 24, receives a reflected first distance measuring light reflected from an object to be measured such as the prism 12 and the like, and outputs a light receiving signal to the first arithmetic control module 48. The first arithmetic control module 48 calculates a distance to the object to be measured based on the light receiving signal (a reciprocating time of the first distance measuring light and a light velocity) from the first distance measuring unit 26.

The image pickup unit 41 acquires an image of the object to be measured. A background light from the object to be measured enters the image pickup unit 41, and an image signal from the image pickup unit 41 is input into the first arithmetic control module 48. Further, the laser pointer unit 44 emits a pointer light on the first distance measuring optical axis 24.

The tracking unit 43 projects a tracking light on a tracking optical axis (not shown) parallel with the first distance measuring optical axis 24. Alternatively, the tracking unit 43 projects in a deflected state so that the tracking optical axis coincides with the first distance measuring optical axis 24. Further, the tracking unit 43 has a tracking light receiving module (not shown), and the tracking light receiving module receives a reflected tracking light reflected by the object to be measured and outputs a light receiving result to the first arithmetic control module 48. The first arithmetic control module 48 calculates a light receiving position on the tracking light receiving module and outputs a driving signal to the horizontal rotation driving unit 17 and the vertical rotation driving unit 27 so that the light receiving position becomes a center position of the tracking light receiving module.

It is to be noted that the first arithmetic control module 48 may detect the object to be measured from the image acquired by the image pickup unit 41, drive the horizontal rotation driving unit 17 and the vertical rotation driving unit 27 so that the object to be measured is positioned at a center of the image, and have the object to be measured to be tracked.

In the first storage module 47, various types of programs are stored. These programs include: an image pickup program for controlling an image acquisition by the image pickup unit 41, a light emission control program for controlling a light emission of the laser pointer unit 44, the first distance measuring unit 26, the tracking unit 43 and the like, a distance measuring program for controlling a distance measurement by the first distance measuring unit 26, an angle measuring program for calculating a directional angle based on obtainment of a horizontal angle and a vertical angle by the first angle measuring unit 42 and a result of the angle detection, a tracking program for executing a tracking, an image processing program for processing an image acquired by the image pickup unit 41, and other programs.

Further, in the first storage module 47, a data storage region is formed. In the data storage region, data such as image data acquired by the image pickup unit 41, distance measurement data acquired by the first distance measuring unit 26, angle measurement data acquired by the first angle measuring unit 42 and the like are stored. The image data, the distance measurement data and the angle measurement data are associated with each other.

The first arithmetic control module 48 performs a required calculation based on the stored data and performs a required control and processing based on the stored programs.

Further, as shown in FIG. 3, the second surveying unit 6 is primarily constituted by the second distance measuring unit 37, a second angle measuring unit 51, the second arithmetic control module 52, the scanning motor 35, and a second storage module 53. It is to be noted that the second angle measuring unit 51 is constituted by the second vertical angle detector 36.

In the second storage module 53, various types of programs are stored. These programs include: a distance measuring program for rotatably irradiating the second distance measuring light 38 by pulse emitting from the second distance measuring unit 37 and performing a distance measurement for each pulsed light, an angle detection program for detecting an angle of the scanning mirror 34 in real time, a data association program for synchronizing and associating between various types of data acquired by the first surveying unit 5 and data acquired by the second surveying unit 6, and other programs. Further, in the second storage module 53, a data storage region is formed. In the data storage region, a measurement result, that is, a distance measurement result and an angle measurement result (point cloud data) for each pulsed light are associated and stored.

The second arithmetic control module 52 performs a required calculation and processing based on the data and the programs stored in the second storage module 53.

Next, by referring to a flowchart in FIG. 4 and FIG. 5, FIG. 6 and FIG. 7, a description will be given on a measurement of a measuring point using the surveying system 1.

(Step 01) When the measurement is started, the first arithmetic control module 48 makes the tracking unit 43 to project a tracking light. The tracking unit 43 starts a tracking of the prism 12 based on a reflected tracking light from the prism 12.

(Step 02) When the tracking is started, the first arithmetic control module 48 executes a measurement of the prism 12 by the first surveying unit 5 in parallel with the tracking. A distance to the prism 12 is measured by the first distance measuring unit 26. Further, a direction of the prism 12 with respect to the surveying instrument 2 is measured based on detection results of the first angle measuring unit 42, that is, the first vertical angle detector 28 and the horizontal angle detector 29.

(Step 03) Next, the target instrument 3 is installed at a measuring point 54. That is, the target instrument 3 is set up in a state where a lower end of the pole 7 is coincided with the measuring point 54. At this time, a tilt of the target instrument 3 is arbitrary, and regarding a direction, it is only necessary that a surface on which the reflection surface 9 is formed, is approximately directed toward the surveying instrument 2.

Figure 5:
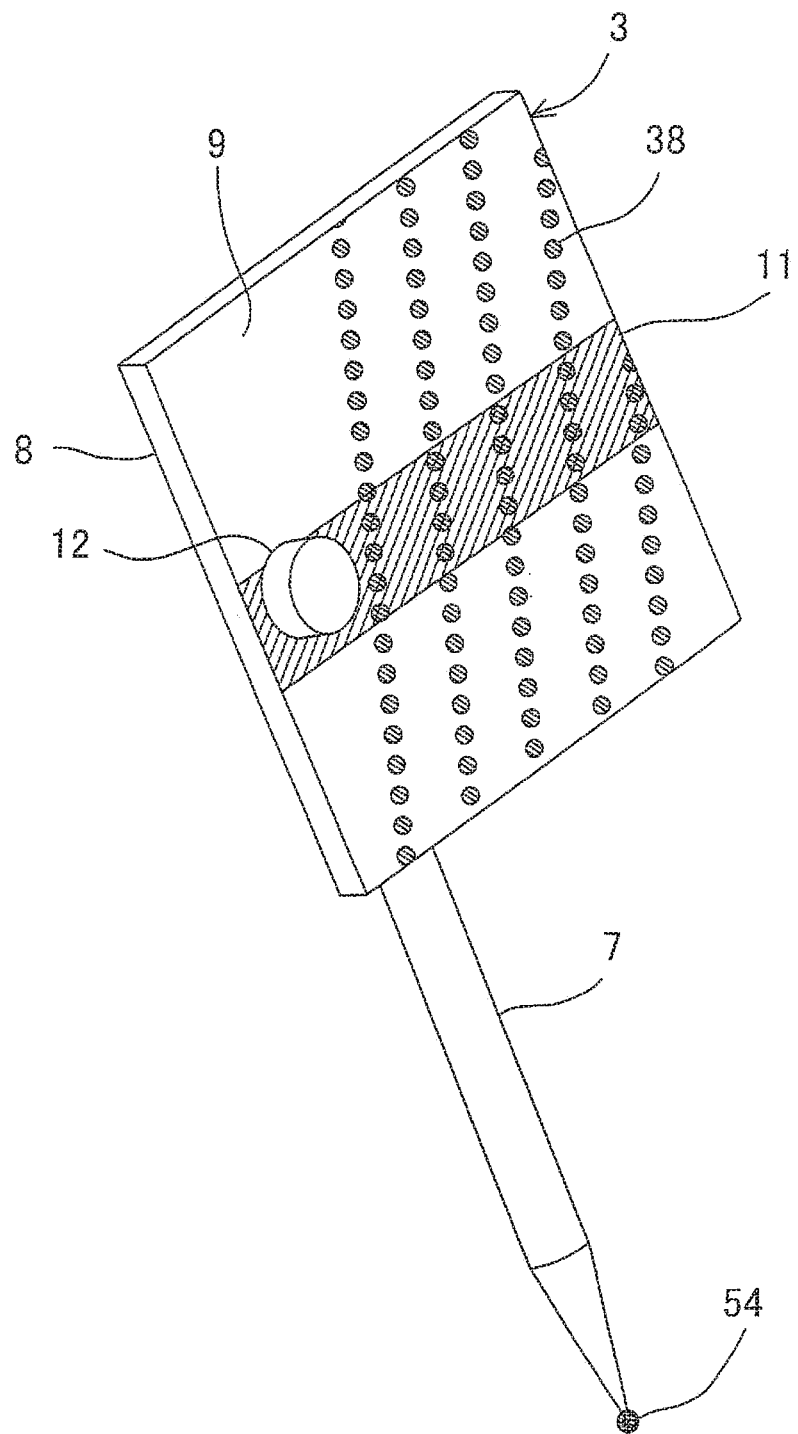
FIG. 5 is a perspective view to show a target instrument according to the first embodiment of the present invention.

(Step 04) Next, the first arithmetic control module 48 cancels the tracking by the first surveying unit 5, and the second arithmetic control module 52 starts a scanning of the reflection surface 9 by the second surveying unit 6. The second distance measuring light 38 is pulse-emitted by the second distance measuring unit 37, and the horizontal rotation driving unit 17 horizontally rotates the frame 19 and the scanning motor 35 vertically rotates the scanning mirror 34. As a result, as shown in FIG. 5, the reflection surface 9 is scanned by the pulsed second distance measuring light 38.

It is to be noted that, in the first embodiment, since the pole 7 is provided on the one side end portion of the target plate 8 and the prism 12 is also positioned on the one side end portion, it is only necessary that the frame 19 rotates the second surveying unit 6 in only one direction toward an other end portion.

(Step 05) When the reflection surface 9 is scanned by the second distance measuring light 36, the second arithmetic control module 52 makes the second distance measuring unit 37 to perform distance measurement for each pulsed light and makes the horizontal angle detector 29 to perform angle measurement of the horizontal angle and makes the second vertical angle detector 36 to perform angle measurement of the vertical angle. That is, three-dimensional point cloud data of the reflection surface 9 is acquired.

Figure 6A:
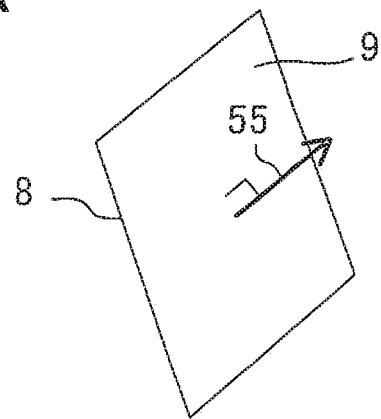
FIG. 6A is an explanatory drawing to explain a normal vector of the target instrument.

(Step 06) Next, from the measurement result (the three-dimensional data) of the reflection surface 9 obtained by scanning the reflection surface 9 and the edge detected with the reflection surface 9, the second arithmetic control module 52 calculates a direction of a plane formed by an outer shape and an edge of the reflection surface 9 (an inclining angle in a front-and-rear direction and a rotation angle around the axis of the pole 7 as a center). Further, the second arithmetic control module 52 calculates the center of the plane obtained by the calculation and calculates a normal vector 55 which is a normal line of the reflection surface 9 passing through the center of the plane and orthogonal to the plane, as shown in FIG. 6A. It is to be noted that it is needless to say that the normal vector 55 may pass anywhere on the plane.

(Step 07) Further, the reflection surface 9 has a high reflectance with respect to the second distance measuring light 38, while the tilt detecting pattern 11 has a low reflectance with respect to the second distance measuring light 38. Therefore, in a case where the target plate 8 is scanned by the second distance measuring light 38, the second arithmetic control module 52 can detect the tilt detecting pattern 11 based on a difference in reflected light amounts.

Figure 6B:
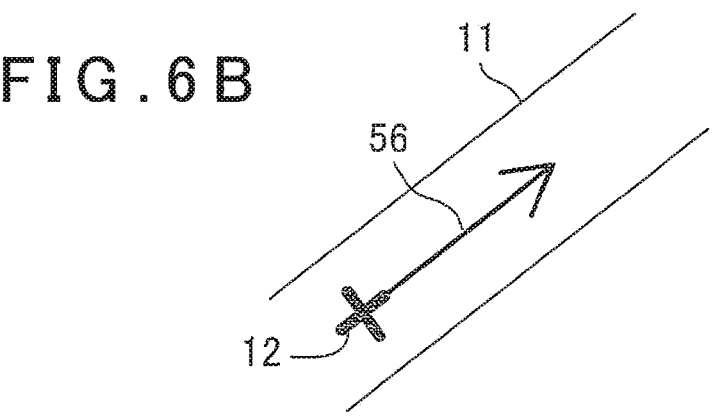
FIG. 6B is an explanatory drawing to explain a tilt direction vector of the target instrument and FIG. 6C is an explanatory drawing to explain a relationship between the normal vector, the tilt direction vector and a measuring point direction vector.

In a case where the axis of the pole 7 is vertical, the tilt detecting pattern 11 is horizontal. Therefore, a tilt angle of the tilt detecting pattern 11 with respect to a horizontal coincides with the tilt angle of the pole 7, that is, the tilt angle of the target instrument 3 in a left-and-right direction with respect to the vertical. When the tilt detecting pattern 11 is detected, the second arithmetic control module 52 calculates a tilt direction vector 56 of the target plate 8, as shown in FIG. 6B, based on a shape (an edge) of the tilt detecting pattern 11. The tilt direction vector 56 is coincident with the direction of the center line of the tilt detecting pattern 11.

Figure 6C:
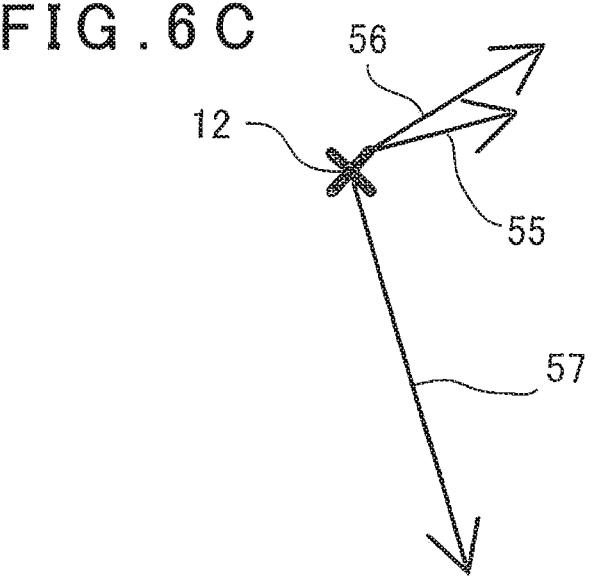

(Step 08) When the normal vector 55 and the tilt direction vector 56 are calculated, the second arithmetic control module 52 calculates a measuring point direction vector 57. The measuring point direction vector 57 is a vector that is orthogonal to the normal vector 55 and the tilt direction vector 56 respectively, and passes through an optical center of the prism 12, as shown in FIG. 6C.

Figure 7:
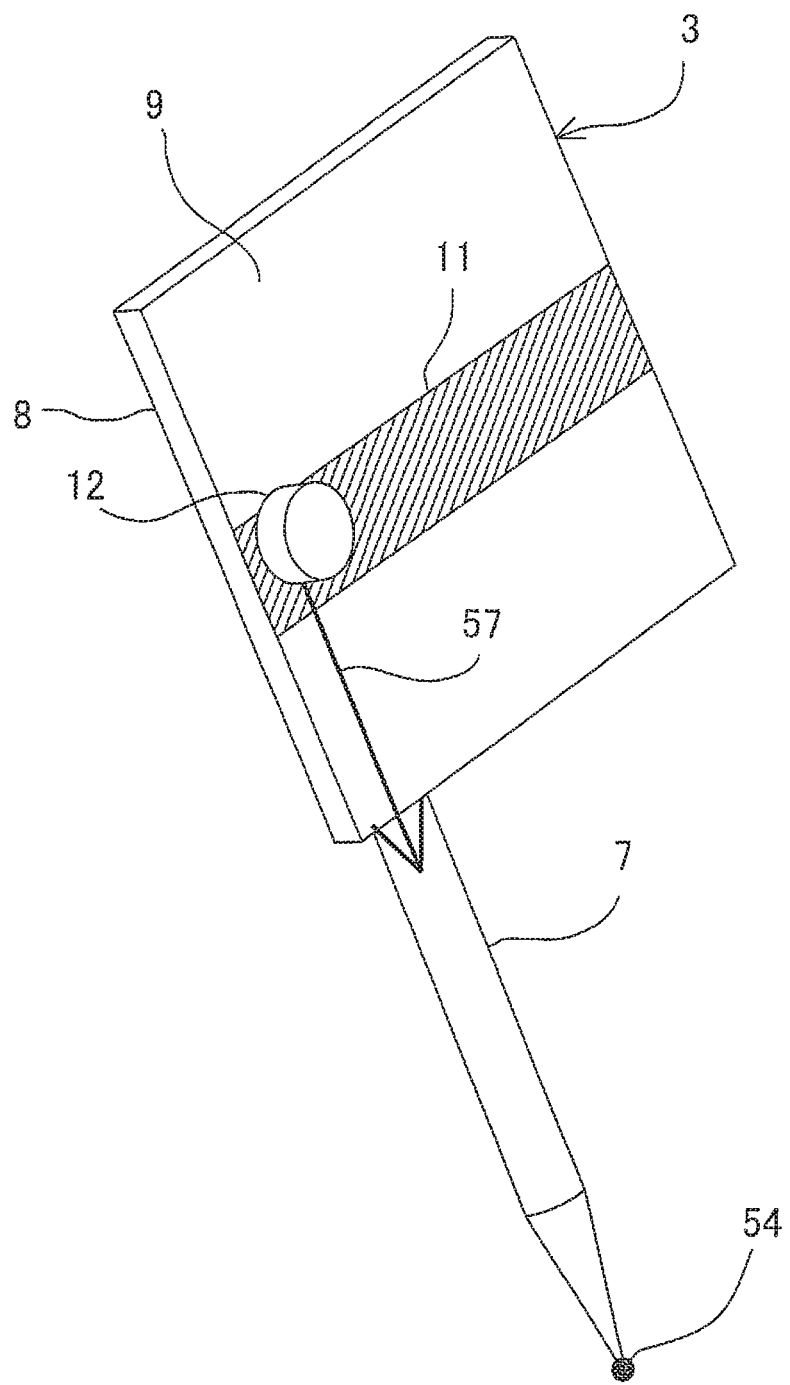
FIG. 7 is an explanatory drawing to explain the measuring point direction vector of the target instrument.

Further, since the optical center of the prism 12 is positioned on the axis of the pole 7, the measuring point direction vector 57 passing through the optical center is coincident with the axis of the pole 7, as shown in FIG. 7. That is, the measuring point direction vector 57 has a tilt angle in front-back and left-right with respect to the vertical of the pole 7 and indicates the tilt direction of the pole 7.

Here, a distance between the optical center of the prism 12 and the lower end of the pole 7 is already known. Therefore, the second arithmetic control module 52 can calculate a three-dimensional coordinate of the measuring point 54 based on the three-dimensional coordinate of the prism 12, the measuring point direction vector 57 and the already known distance. That is, the second arithmetic control module 52 can calculate a point positioned along the direction of the measuring point direction vector 57 from the optical center of the prism 12 only by the already known distance in a downward direction as the measuring point 54 and calculate the three-dimensional coordinate of the measuring point 54.

When the three-dimensional coordinate of the measuring point 54 is calculated, the measurement is finished. Alternatively, a required processing such that the target instrument 3 is moved in a state where the prism 12 is tracked again by the first surveying unit 5 and is installed at another measuring point, or the like, is performed.

As described above, in the first embodiment, the target plate 8 is provided on the upper end of the pole 7, and the tilt detecting pattern 11 is formed on the target plate 8 so as to be orthogonal to the axis of the pole 7. Further, the prism 12 provided on the target plate 8 in such a manner that the optical center of the prism 12 is positioned on the axis of the pole 7.

Based on the point cloud data acquired by scanning the reflection surface 9, since the measuring point direction vector 57, that is, the tilt direction of the pole 7 (the tilt angle in the front-back and left-right) can be detected, even in a case where the target instrument 3 is tilted, the three-dimensional coordinate of the measuring point 54 can be calculated.

Therefore, when a prism surveying of the measuring point 54 is performed, since there is no need to level the target instrument 3 vertically, a working time can be reduced and a working efficiency can be improved.

Further, even if the target instrument 3 is tilted, since the three-dimensional coordinate of the measuring point 54 can be calculated, the prism surveying can be performed even for the measuring point 54 at a position where the target instrument 3 cannot be set up vertically such as a corner of a room or the like.

It is to be noted that, in the first embodiment, the pole 7 is provided on the one side end portion of the target plate 8, but the pole 7 may be provided at a central portion of the target plate 8, for instance. By providing the pole 7 at the center of the target plate 8 and by further forming the reflection surface 9 and the tilt detecting pattern 11 on both front and rear surfaces of the target plate 8, a discrimination between the front and the rear of the target plate 8 is eliminated. Therefore, since not only the tilt of the pole 7 but also the surface of the target plate 8 directed to the surveying instrument 2 can be arbitrary, the working efficiency can be further improved.

Figure 8:
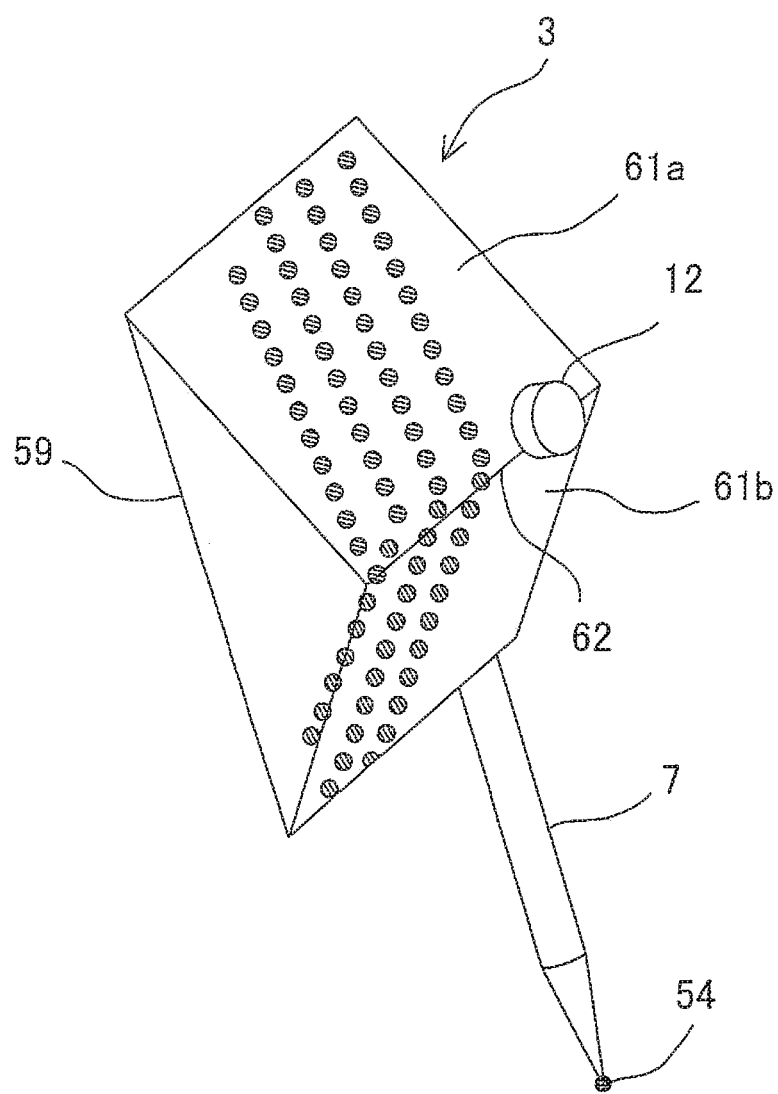
FIG. 8 is a perspective view to show a target instrument according to a second embodiment of the present invention.
Figure 9A:
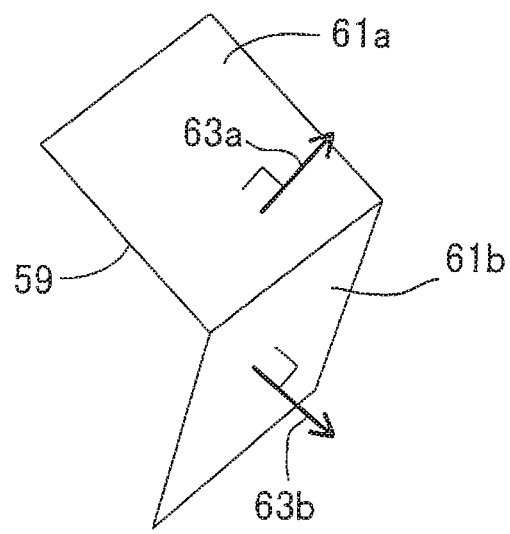
FIG. 9A is an explanatory drawing to explain a normal vector of the target instrument.

Next, by referring to FIG. 8, FIG. 9 and FIG. 10, a description will be given on a second embodiment of the present invention. It is to be noted that, in FIG. 8, FIG. 9 and FIG. 10, the same components as shown in FIG. 5, FIG. 6 and FIG. 7 are referred by the same symbols, and a detailed description thereof will be omitted.

In the second embodiment, a target instrument 3 is constituted by a pole 7, a prism 12 and a target plate 59.

The target plate 59 has a triangular prism shape on which the pole 7 is provided on one end portion, and a lateral cross-section has an isosceles triangular shape, for instance. Further, the target plate 59 has reflection surfaces 61a and 61b formed on two surfaces by two sides with an equal length. The prism 12 is provided on a ridge line 62 formed by the reflection surfaces 61a and 61b in such a manner that the ridge line 62 is directed toward the surveying instrument 2. It is to be noted that the lateral cross-section of the target plate 59 does not have to be the isosceles triangular shape as long as the target plate 59 has a shape that can direct the ridge line 62 toward the surveying instrument 2.

A straight line in parallel with an axis of the pole 7 passing through an optical center of the prism 12 is orthogonal to the ridge line 62. Further, a horizontal distance between the straight line and the axis of the pole 7 is already known, and a vertical distance between the optical center of the prism 12 and a lower end of the pole 7 is already known. That is, a position of the lower end (a measuring point 54) of the pole 7 with respect to the optical center of the prism 12 is already known.

In the second embodiment, in a state where the lower end of the pole 7 is aligned on the measuring point 54, the reflection surfaces 61a and 61b are directed toward the surveying instrument 2 (see FIG. 1) and the prism surveying is started.

A second arithmetic control module 52 acquires point cloud data by scanning the reflection surfaces 61a and 61b by a second distance measuring light 38. Based on measurement results of the reflection surfaces 61a and 61b and an edge, the second arithmetic control module 52 (see FIG. 3) calculates a direction of a plane formed by outer shapes and each edge of the reflection surfaces 61a and 61b (an inclining angle in a front-and-rear direction and a rotation angle around the axis of the pole 7 as a center). Further, the second arithmetic control module 52 calculates the normal vectors 63a and 63b of the reflection surfaces 61a and 61b orthogonal to the plane as shown in FIG. 9A, based on the calculated direction of the plane.

It is to be noted that, in the second embodiment, the ridge line 62 has a function equivalent to a tilt detecting pattern 11 in the first embodiment.

Figure 9B:
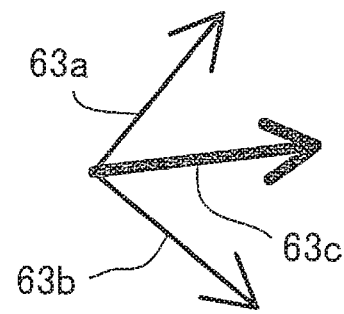
FIG. 9B is an explanatory drawing to explain an average normal vector of the target instrument and FIG. 9C is an explanatory drawing to explain a ridge line vector of the target instrument.
Figure 10:
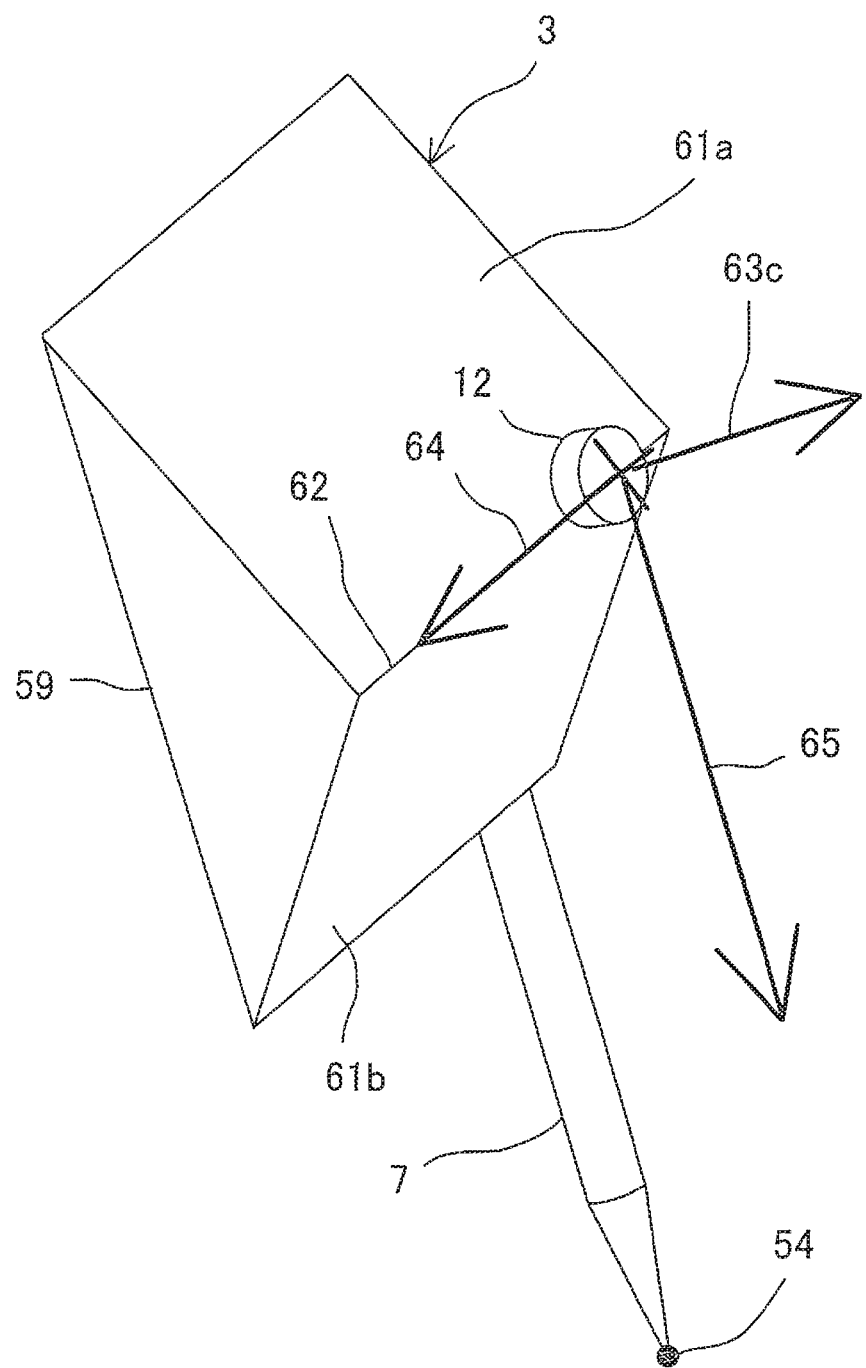
FIG. 10 is an explanatory drawing to explain a measuring point direction vector of the target instrument.

The second arithmetic control module 52 can calculate an average normal vector 63c of the target plate 59 orthogonal to the axis of the pole 7 and orthogonal to the ridge line 62 as shown in FIG. 9B, by averaging the normal vectors 63a and 63b.

Figure 9C:
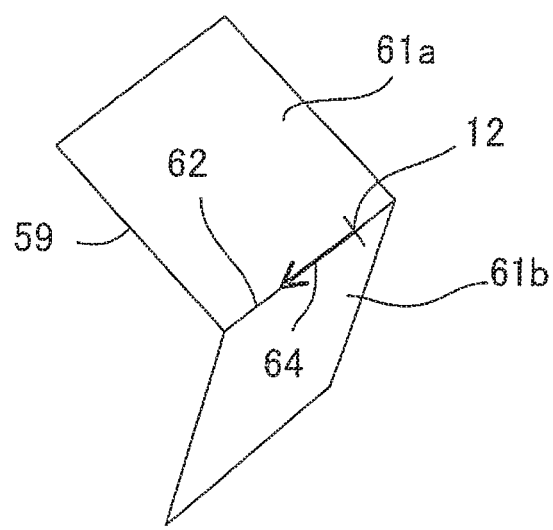

Further, the second arithmetic control module 52 can calculate a ridge line vector 64 along the ridge line 62 as shown in FIG. 9C based on the edge detected when the reflection surfaces 61a an 61b are scanned. The ridge line vector 64 is orthogonal to the average normal vector 63c and is at a right angle with respect to the axis of the pole 7.

When the average normal vector 63c and the ridge line vector 64 are calculated, the second arithmetic control module 52 calculates a measuring point direction vector 65 orthogonal to the average normal vector 63c and the ridge line vector 64 respectively and passes through the optical center of the prism 12.

The measuring point direction vector 65 is in parallel with the axis of the pole 7 and includes a tilt angle information in front-back and left-right of the pole 7. Further, the horizontal distance between the measuring point direction vector 65 and the axis of the pole 7 and the vertical distance from the optical center of the prism 12 to the measuring point 54 are both already known. Therefore, based on a three-dimensional coordinate of the prism 12, the measuring point direction vector 65 and the already known horizontal distance and vertical distance, the second arithmetic control module can calculate a three-dimensional coordinate of the measuring point 54.

In the second embodiment, too, based on the point cloud data of the reflection surfaces 61a and 61b, the average normal vector 63c, the ridge line vector 64 and the measuring point direction vector 65 are calculated, and based on the three-dimensional coordinate of the prism 12 and the measuring point direction vector 65 and the like, since the three-dimensional coordinate of the measuring point 54 can be calculated, there is no need to level the target instrument 3 vertically, and a working time can be reduced and a working efficiency can be improved.

It is to be noted that, in the second embodiment, the target plate 59 is mounted on the pole 7 in such a manner that the ridge line 62 and the axis of the pole 7 become a right angle, but the target plate 59 may be mounted on the pole 7 so that the ridge line 62 and the axis of the pole 7 are in parallel.

In this case, since the tilt angle of the ridge line 62 in the front-back and left-right coincides with the tilt angle of the pole 7 in the front-back and left-right, the ridge line vector 64 can be calculated as the measuring point direction vector 65.

Figure 11:
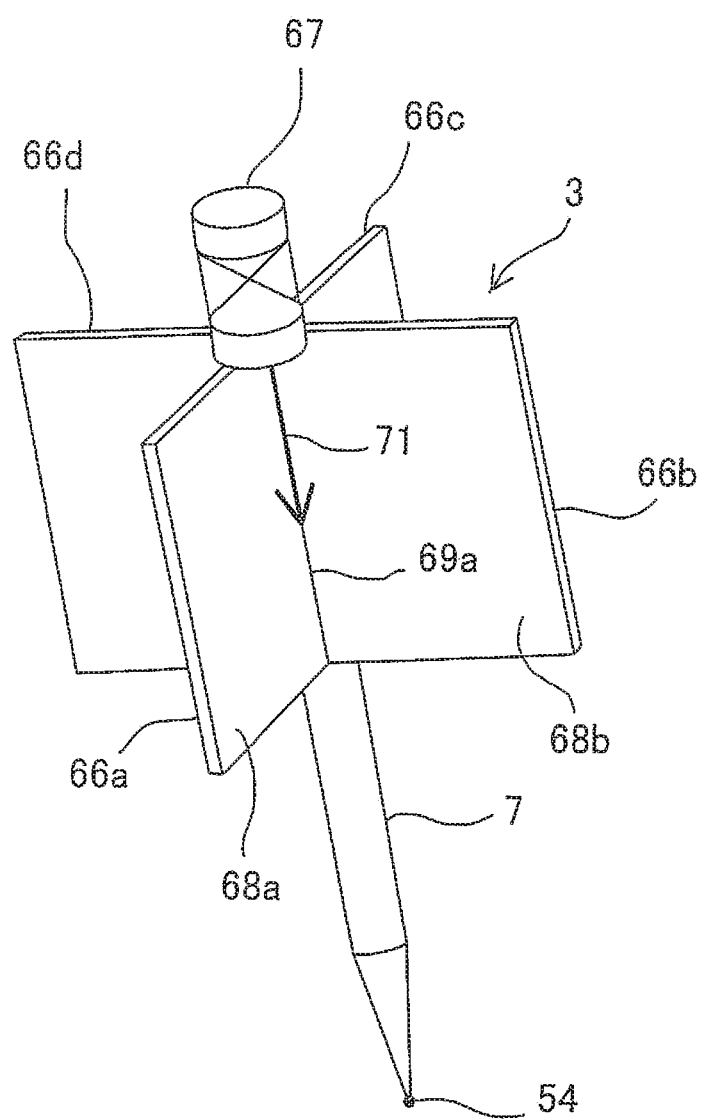
FIG. 11 is a perspective view to show a target instrument according to a third embodiment of the present invention.

Next, by referring to FIG. 11, a description will be given on a third embodiment of the present invention. It is to be noted that, in FIG. 11, the same components as shown in FIG. 5, FIG. 6 and FIG. 7 are referred by the same symbols, and a detailed description thereof will be omitted.

In the third embodiment, a target instrument 3 is constituted by a pole 7, four target plates 66a to 66d provided on an upper end the pole 7, and an omnidirectional prism 67 provided on upper ends of the target plates 66a to 66d. The target plates 66a to 66d are arranged in parallel with the axis of the pole 7 and radially around the pole 7 as a center, and provided at an equal angular interval (90°).

The target plates 66a to 66d are plate-like shaped members elongated in an up-and-down direction, and reflection surfaces 68a to 68h are formed on both surfaces, respectively. It is to be noted that, in FIG. 11, only the reflection surfaces 68a and 68b are illustrated.

Further, a ridge line 69a is formed by the adjacent reflection surfaces 68a and 68b, a ridge line 69b (not shown) is formed by the reflection surfaces 68c and 68d, a ridge line 69c (not shown) is formed by the reflection surfaces 68e and 68f, and a ridge line 69d (not shown) is formed by the reflection surfaces 68g and 68h. It is to be noted that, in FIG. 11, only the ridge line 69a is illustrated. The ridge lines 69a to 69d are in parallel with the axis of the pole 7, respectively, and a distance between each of the ridge lines 69a to 69d and the axis of the pole 7 is already known, respectively.

An optical center of the omnidirectional prism 67 is positioned on the axis of the pole 7, and a distance from the optical center of the omnidirectional prism 67 to the lower end of the pole 7 is already known.

In the third embodiment, the lower end of the pole 7 is coincided with a measuring point 54, and the target instrument 3 is installed on the measuring point 54 so that the two reflection surfaces (reflection surfaces 68a and 68b) in the reflection surfaces 68a to 68h are directed toward a surveying instrument 2 (see FIG. 1).

A second arithmetic control module 52 (see FIG. 3) scans the reflection surfaces 68a and 68b by a second distance measuring light 38 (see FIG. 2) and acquires point cloud data of the reflection surfaces 68a and 68b. The second arithmetic control module 52 detects a plane formed by outer shapes and each edge of the reflection surfaces 68a and 68b based on the point cloud data of the reflection surfaces 68a and 68b, and calculates a measuring point direction vector 71 based on a direction and a tilt of the plane. In the third embodiment, the measuring point direction vector 71 is in parallel with each of the ridge lines 69a to 69d.

Finally, the second arithmetic control module 52 calculates a three-dimensional coordinate of the measuring point 54 based on a three-dimensional coordinate of the optical center of the omnidirectional prism 67, the measuring point direction vector 71, the distance between the ridge line 69a and the axis of the pole 7, and the distance between the optical center of the omnidirectional prism 67 and the lower end of the pole 7.

In the third embodiment, the measuring point direction vector 71 is in parallel with the axis of the pole 7 and the horizontal distance between the measuring point direction vector 71 and the axis of the pole 7 is also already known. As a result, there is no need to calculate normal vectors of the reflection surface 68a and 68b or a tilt direction vector indicating the tilt of the pole 7 in the left-and-right direction.

Therefore, since only the measuring point direction vector 71 needs to be calculated, a calculation burden is reduced and a processing time can be reduced.

Further, it is configured in such a manner that the four target plates 66a to 66d are provided radially at a 90° interval on the pole 7, the reflection surfaces 68a to 68h are formed on both surfaces of each of the target plates 66a to 66d, respectively, and the omnidirectional prism 67 is provided on upper ends of the target plates 66a to 66d. Therefore, a prism surveying of the target instrument 3 from any direction in 360° is possible, and a working efficiency can be improved.

It is to be noted that, in the third embodiment, the four target plates 66 are provided at the 90° interval, but the number of the target plates 66 is not limited to four. For instance, three target plates 66 may be provided at a 120° interval or five target plates 66 may be provided at a 72° interval.

Further, it is configured in such a manner that the target plates 66a to 66d are provided on a peripheral surface of the pole 7 and the omnidirectional prism 67 is provided on the upper end of the pole 7. In this case, the target, plates 66a to 66d are disposed so that extension lines of the adjacent reflection surfaces cross each other at the axis of the pole 7.

Next, by referring to FIG. 12, FIG. 13, FIG. 14 and FIG. 15, a description will be given on a fourth embodiment of the present invention. It is to be noted that, in FIG. 12, FIG. 13, FIG. 14 and FIG. 15, the same components as shown in FIG. 5, FIG. 6 and FIG. 7 are referred by the same symbols, and a detailed description thereof will be omitted.

A target plate 59 in the fourth embodiment has the same shape as that of a target plate 59 in the second embodiment.

Further, in the fourth embodiment, a first distance measuring optical axis 24 (see FIG. 1) and a second distance measuring optical axis 40 (see FIG. 1) are offset in a horizontal direction only by a distance "d". It is to be noted that the first distance measuring optical axis 24 and the second distance measuring optical axis 40 may offset by providing a second surveying unit 6 (see FIG. 2) at a position offset in a horizontal direction from a vertical line 15 (see FIG. 2). Further, the second surveying unit 6 may be made rotatable with respect to a frame 19 (see FIG. 2), and the distance "d" may be made adjustable.

By offsetting the first distance measuring optical axis 24 and the second distance measuring optical axis 40, a first distance measuring light from a first surveying unit 5 (see FIG. 2) and a second distance measuring light 38 from the second surveying unit 6 (see FIG. 2) can be projected at the same time. Therefore, surveying by the first surveying unit 5 and surveying by the second surveying unit 6 can performed in parallel.

Figure 12:
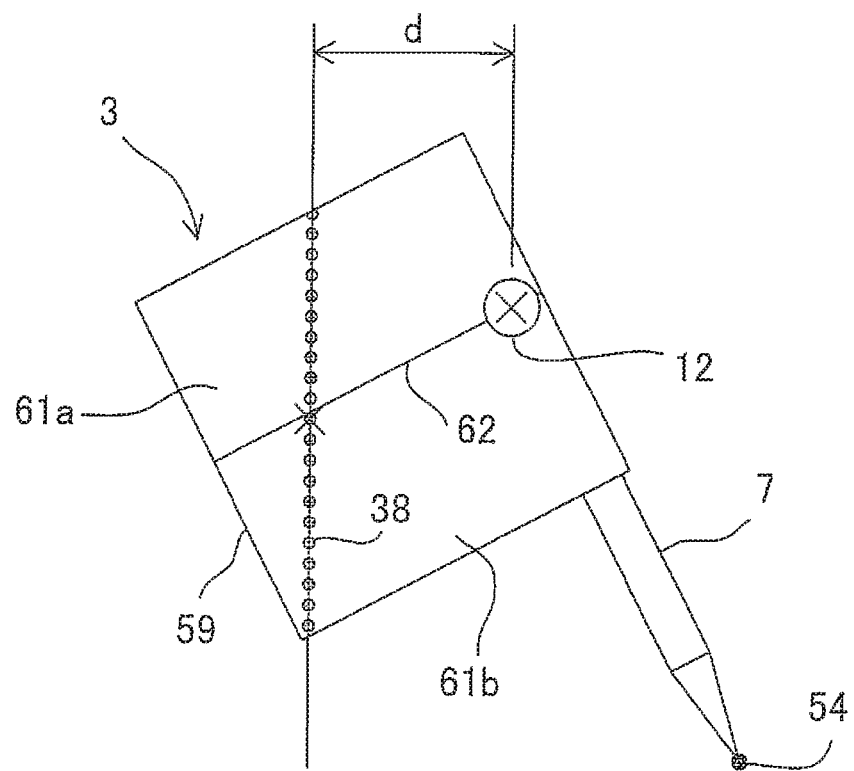
FIG. 12 is a front view to show a target instrument according to a fourth embodiment of the present invention.

In the fourth embodiment, the first surveying unit 5 locks a prism 12, and in a state where the prism 12 is tracked, as shown in FIG. 12, the second surveying unit 6 scans the second distance measuring light 38 in the vertical direction.

Figure 13:
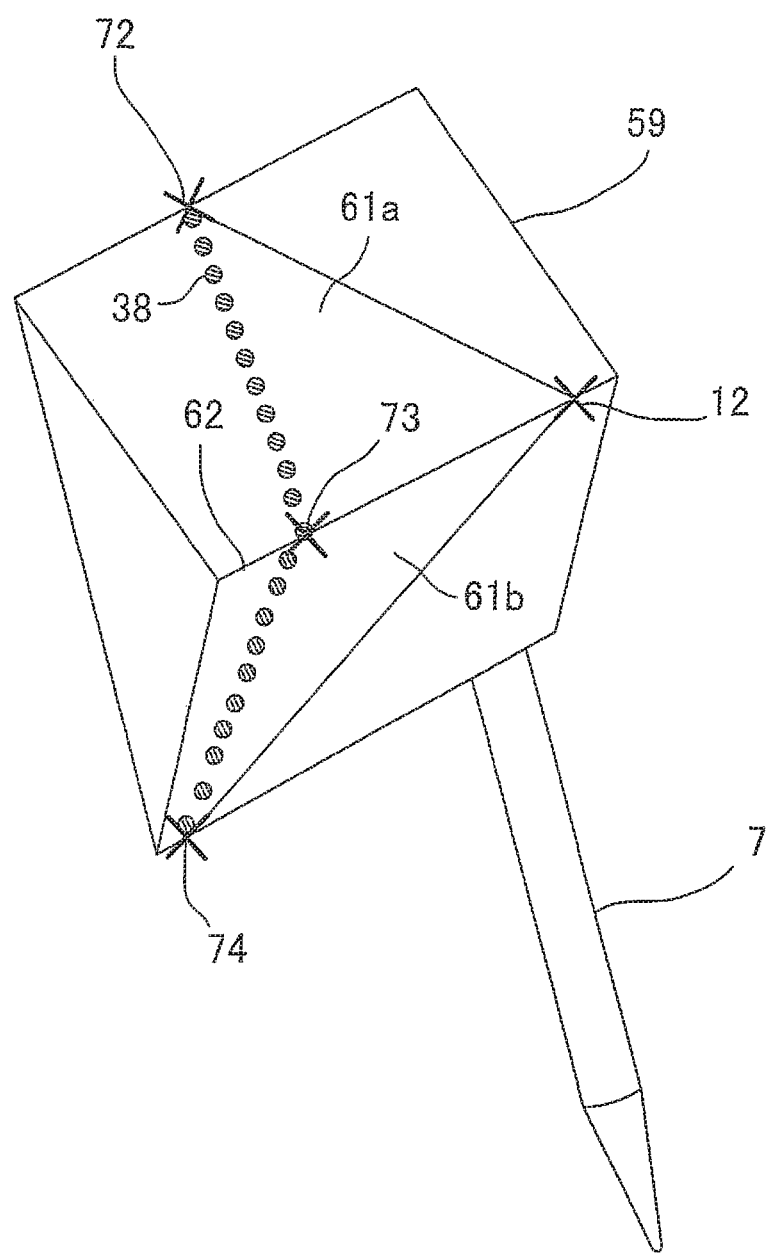
FIG. 13 is an explanatory drawing to explain a detecting of a surface in the target instrument.

By the scanning of the second distance measuring light 38, one row of point cloud data on the reflection surfaces 61a and 61b is acquired. Based on the one row of point cloud data, a second arithmetic control module 52 (see FIG. 3) detects edges of the reflection surfaces 61a and 61b, that is, a first edge 72 which is an upper end of the reflection surface 61a, a second edge 73 on a ridge line 62, and a third edge 74 which is a lower end of the reflection surface 61b, respectively, as shown in FIG. 13. Further, the second arithmetic control module 52 detects a surface formed by the optical center of the prism 12 and the first edge 72 and the second edge 73, as the reflection surface 61a and detects a surface formed by the optical center of the prism 12 and the second edge 73 and the third edge 74, as the reflection surface 61b.

Figure 14A:
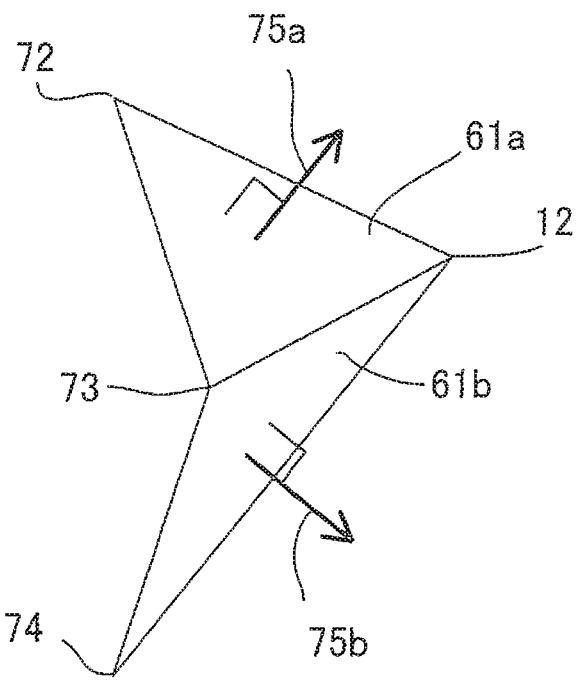
FIG. 14A is an explanatory drawing to explain a normal vector of the target instrument and FIG. 14B is an explanatory drawing to explain an average normal vector of the target instrument.
Figure 14B:
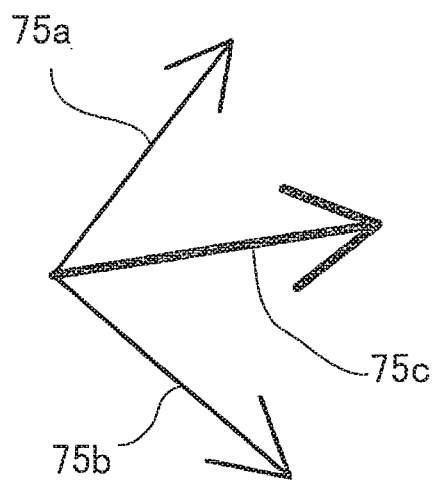
Figure 15:
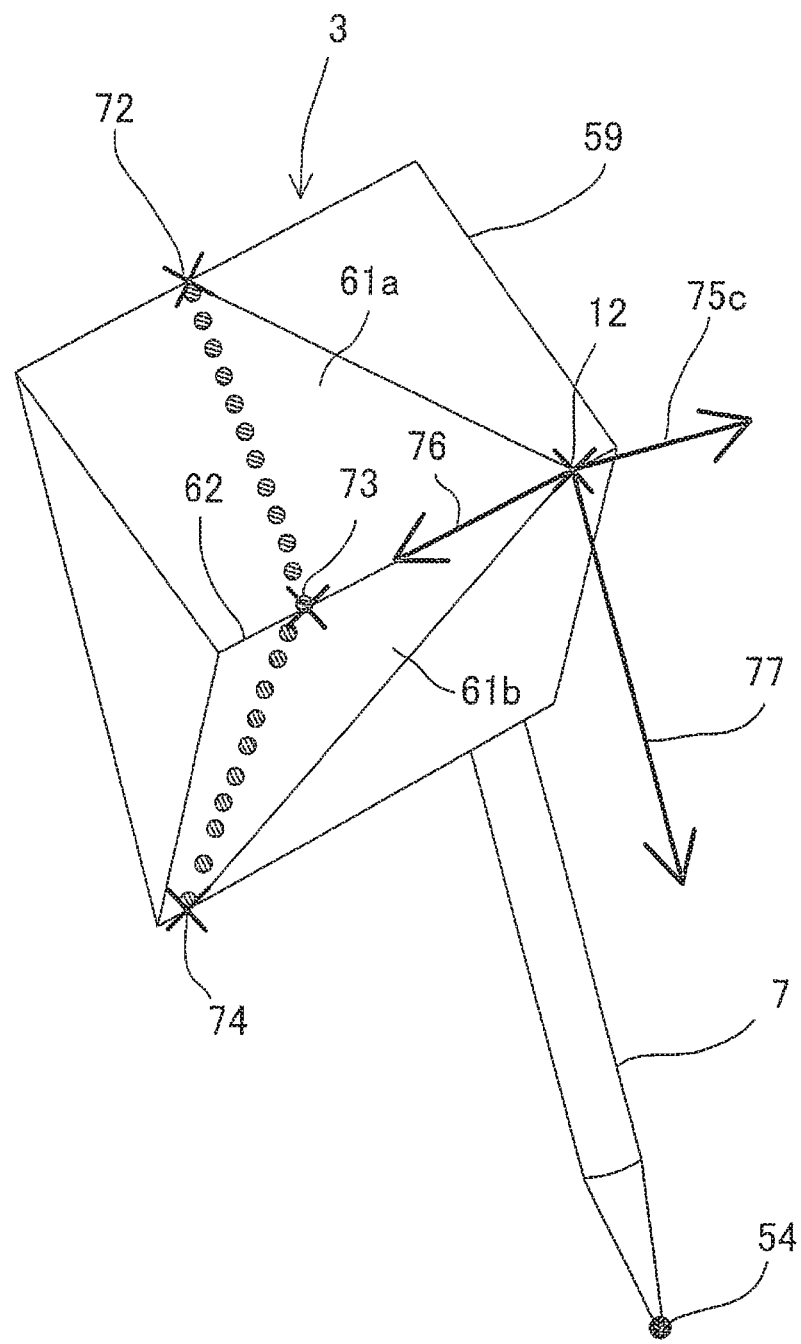
FIG. 15 is an explanatory drawing to explain a measuring point direction vector of the target instrument.

Next, the second arithmetic control module 52 calculates normal vectors 75a and 75b, respectively, as shown in FIG. 14A, with respect to the detected reflection surfaces 61a and 61b. Further, the second arithmetic control module 52 averages the normal vectors 75a and 75b and calculates an average normal vector 75c as shown in FIG. 14B.

Further, the second arithmetic control module 52 detects a line connecting the optical center of the prism 12 and the second edge 73 as the ridge line 62 and calculates a ridge line vector 76 based on the ridge line 62.

Finally, the second arithmetic control module 52 calculates a measuring point direction vector 77 orthogonal to the average normal vector 75c and the ridge line vector 76, respectively, and passing through the optical center of the prism 12, and calculates the three-dimensional coordinate of the measuring point 54 based on the three-dimensional coordinate of the optical center of the prism 12, the measuring point direction vector 77, and a known positional relationship (distance) between the optical center of the prism 12 and the lower end of the pole 7.

In the fourth embodiment, the first distance measuring optical axis 24 and the second distance measuring optical axis 40 are offset in a horizontal direction. As a result, a tracking and a surveying of the prism 12 by the first surveying unit 5 and the calculating of the three-dimensional coordinate of the measuring point 54 by the second surveying unit 6 can be performed in parallel.

Therefore, there is no need to stop and to resume the tracking each time a laser scanning is performed by the second surveying unit 6, a working time can be reduced and a working efficiency can be improved.

Next, by referring to FIG. 16, a description will be given on a fifth embodiment of the present invention. It is to be noted that, in FIG. 16, the same components as shown in FIG. 11 are referred by the same symbols, and a detailed description thereof will be omitted.

In a target instrument 3, a predetermined number, such as three, of target plates 66a to 66c at a 120° interval for instance, are provided at an equal angular interval on a pole 7 (not shown). An omnidirectional prism 67 is provided on upper ends of the target plates 66a to 66c, and an electronic distance meter 78 is provided on a lower end of the pole 7.

Figure 16:
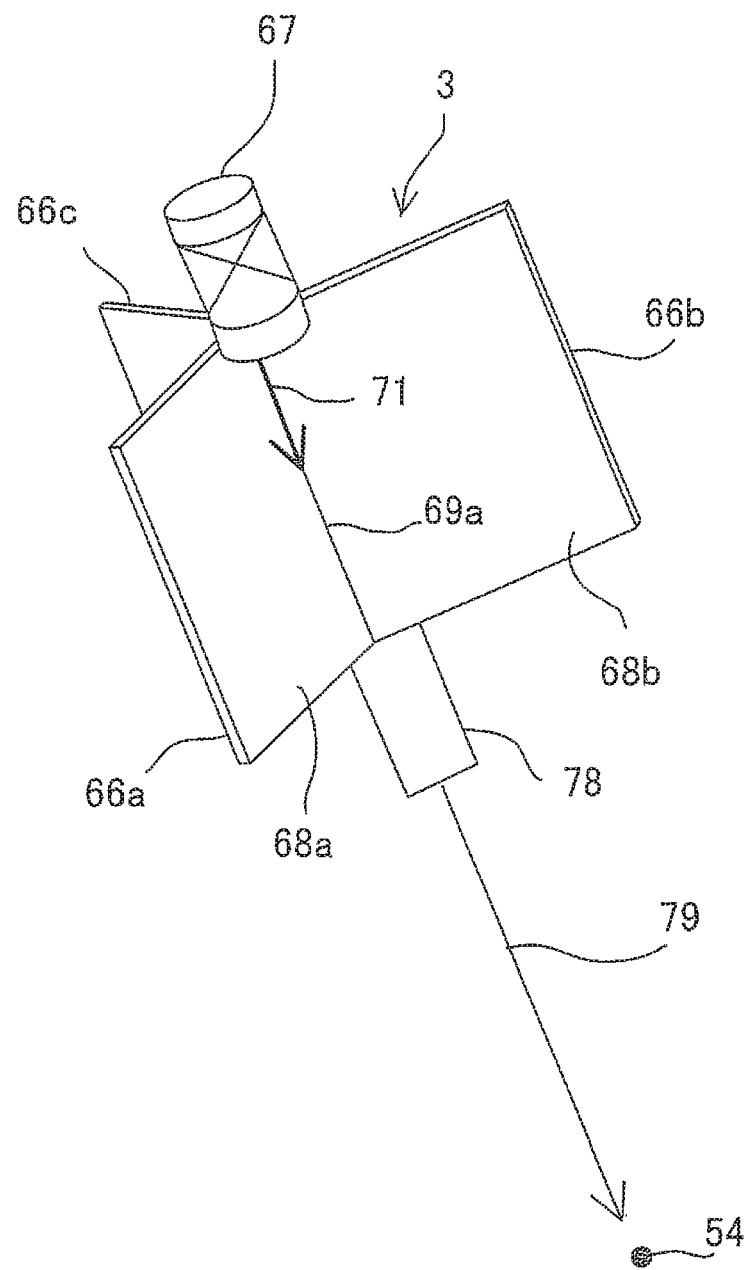
FIG. 16 is a perspective view to show a target instrument according to a fifth embodiment of the present invention.

In the target plates 66a to 66c, reflection surfaces 68a to 68f (only the reflection surfaces 68a and 68b are illustrated in FIG. 16) are formed on both surfaces, respectively. A ridge line 69a is formed by the adjacent reflection surfaces 68a and 68b, a ridge line 69b is formed by the adjacent reflection surfaces 68c and 68d, and a ridge line 69c is formed by the adjacent reflection surfaces 68e and 68f. The ridge lines 69a to 69c only the ridge line 69a is illustrated in FIG. 16) are in parallel with the axis of the pole 7, and distances between the both are already known, respectively.

Further, an optical center of the omnidirectional prism 67 positioned on the axis of the pole 7. An optical axis of a pointer light 79 projected from the electronic distance meter 78 coincides with the axis of the pole 7 or has an already known relationship, and a distance from the optical center of the omnidirectional prism 67 to a measurement reference position of the electronic distance meter 78 is already known.

When a measurement of a measuring point 54 is performed, the pointer light 79 is projected from the electronic distance meter 78, and the pointer light 79 is aligned with the measuring point 54. Further, a second arithmetic control module 52 (see FIG. 3) calculates a measuring point direction vector 71 by a method similar to that of the third embodiment and calculates a three-dimensional coordinate or the measuring point 54 based on a three-dimensional coordinate of the omnidirectional prism 67, the measuring point direction vector 71, a distance between the measuring point direction vector 71 and the axis of the pole 7, a distance between the omnidirectional prism 67 and the electronic distance meter 78, and a distance measurement result of the electronic distance meter 78.

In the fifth embodiment, only by projecting the pointer light 79 toward the measuring point 54, a distance between the optical center of the omnidirectional prism 67 and the measuring point 54 can be measured. Therefore, based on the three-dimensional coordinate of the optical center of the omnidirectional prism 67 measured by the measuring instrument 2 and the tilt of the pole 7, a three-dimensional coordinate of the measuring point 54 can be calculated. Therefore, there is no need to bring the lower end of the pole 7 into contact with the measuring point 54, and a prism surveying can be performed also for the measuring point 54 located at a position where the pole 7 cannot reach.

It is to be noted that the fifth embodiment has a constitution in which the electronic distance meter 78 is applied to a target instrument 3 in the third embodiment, but it is needless to say that the electronic distance meter 78 can be similarly applied also to the first embodiment, the second embodiment and the fourth embodiment.

Figure 17:
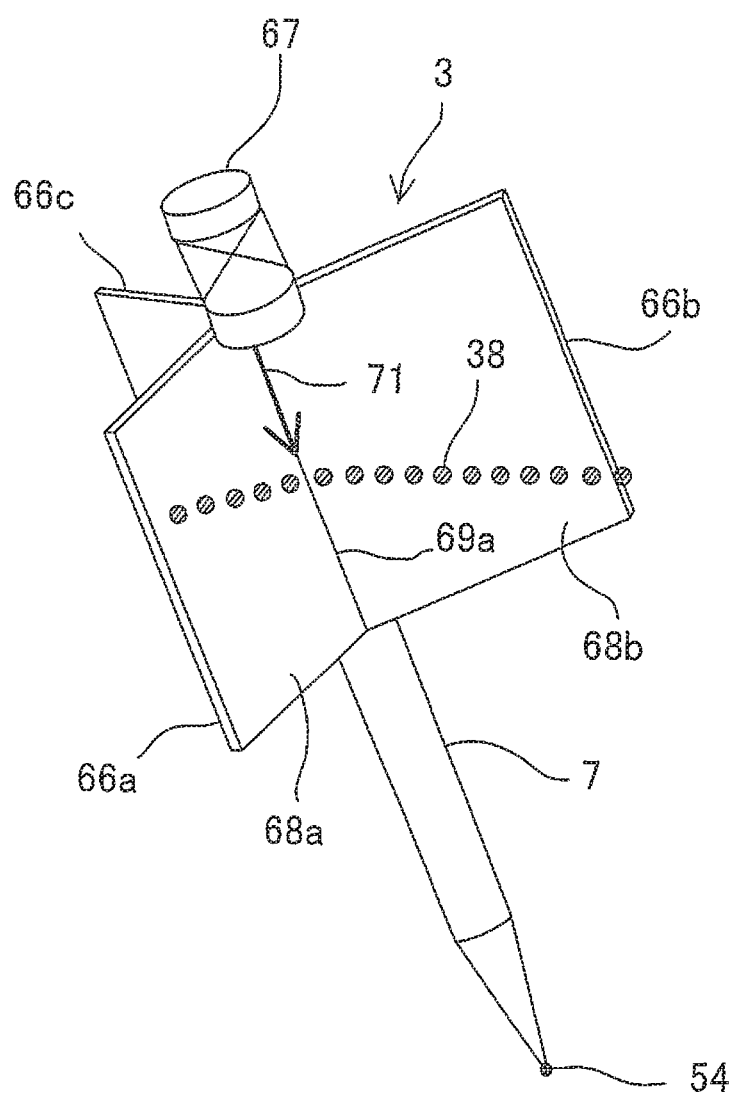
FIG. 17 is a perspective view to show a target instrument according to a sixth embodiment of the present invention.

Next, by referring to FIG. 17, a description will be given on a sixth embodiment of the present invention. It is to be noted that, in FIG. 17, the same components as shown in FIG. 11 are referred by the same symbols, and a detailed description thereof will be omitted.

Figure 18:
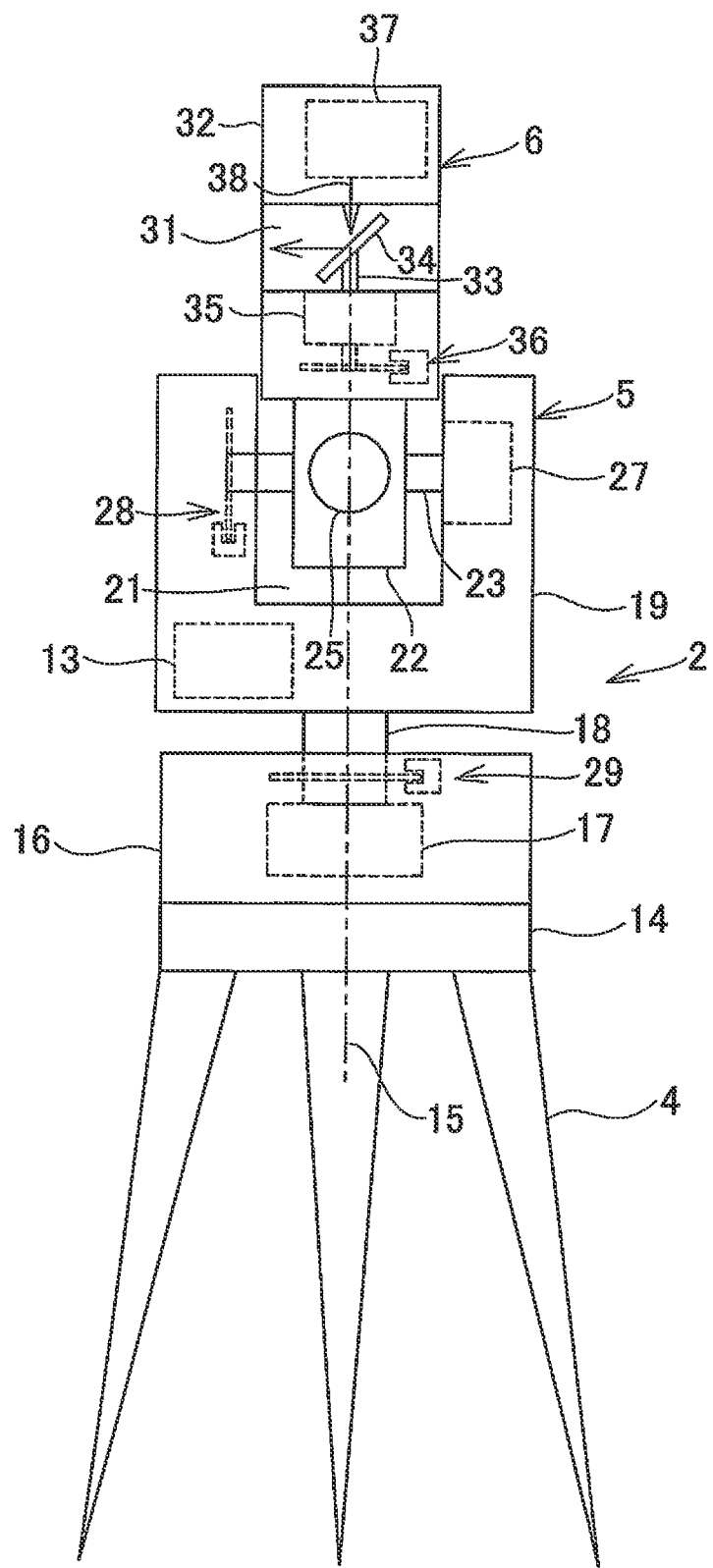
FIG. 18 is a front view to show a surveying instrument of the surveying system according to a sixth embodiment of the present invention.

In the sixth embodiment, a second surveying unit 6 (see FIG. 18) is directly mounted on a telescope unit 22 (see FIG. 18), and the second surveying unit 6 is a uniaxial laser scanner capable of rotating and irradiating a second distance measuring light 38 in horizontal direction. By a cooperative operation of a vertical rotation of the telescope unit 22 and a horizontal rotation of a scanning mirror 34, a two-dimensional scanning is made possible, and a three-dimensional coordinate of an object to be measured can be measured.

Since the constitution of a target instrument 3 is similar to that of a target instrument 3 in the third embodiment except for the fact that three target plates 66a to 66c are provided radially at a 120° interval, a description thereof will be omitted.

When performing a measurement of a measuring point 54, after a tracking of an omnidirectional prism 67 by a first surveying unit 5 (see FIG. 2) is stopped, the scanning mirror 34 is horizontally rotated by a scanning motor 35, and the telescope unit 22 is vertically rotated by a vertical rotation driving unit 27 (see FIG. 2), and an entire region of reflection surfaces 68a and 68b are scanned by the second distance measuring light 38.

Based on acquired point cloud data, a second arithmetic control module 52 (see FIG. 3) calculates a plane formed by outer shapes of the reflection surfaces 68a and 68b and a detected edge and calculates a measuring point direction vector 71. Therefore, based on a three-dimensional coordinate of the omnidirectional prism 67 and a known positional relationship (distance) between the omnidirectional prism 67 and the lower end of the pole 7, a three-dimensional coordinate of the measuring point 54 can be calculated regardless of a tilt of the target instrument 3.

It is to be noted that, it is needless to say that the constitution of the second surveying unit 6 in the sixth embodiment can be applied also to a target instrument 3 in the first embodiment, the second embodiment, the fourth embodiment and the fifth embodiment.

The invention claimed is:

1. A surveying system, having a surveying instrument comprising a first surveying unit which projects a distance measuring light and measures a prism, a second surveying unit provided integrally with said first surveying unit, and an arithmetic control module, and a target instrument installed at a measuring point, wherein said first surveying unit comprises a frame in a horizontally rotatable manner, a telescope unit provided on said frame in a vertically rotatable manner, a first angle measuring unit which detects a horizontal angle of said frame and a vertical angle of said telescope unit, and a first distance measuring unit which is accommodated in said telescope unit and measures a distance to said prism, wherein said second surveying unit comprises a scanning mirror which rotatably irradiates a laser beam to one axis in a vertical direction or a horizontal direction and a second angle measuring unit which detects a vertical angle of said scanning mirror, wherein said target instrument comprises a pole, said prism provided on an axis of said pole and has a known positional relationship with a lower end of said pole, and a target plate mounted on said pole, wherein said arithmetic control module scans a laser beam by a cooperative operation of the horizontal rotation of said frame or the vertical rotation of said telescope unit and the vertical rotation or the horizontal rotation of said scanning mirror, acquires point cloud data of said target plate, calculates a measuring point direction vector indicating a tilt direction of said pole based on a measurement result of a surface of said target plate obtained from said point cloud data, and calculates a three-dimensional coordinate of said measuring point based on the three-dimensional coordinate of an optical center of said prism measured by said first measuring unit, said measuring point direction vector, and the positional relationship between the optical center of said prism and the lower end of said pole, wherein said target plate has a plate-like shape, said target plate has a tilt detecting pattern extending in a direction orthogonal to the axis of said pole from one side end to another side end, said arithmetic control module calculates a vector orthogonal to a normal vector calculated based on the measurement result of the surface of said target plate and a tilt direction vector calculated based on an edge detection of said tilt detecting pattern, respectively, and passing through the optical center of said prism as said measuring point direction vector.

2. The surveying system according to claim 1, wherein said second surveying unit is provided on said frame and rotatably irradiates said laser beam to a vertical direction by the rotation of said scanning mirror.

3. The surveying system according to claim 1, wherein said second surveying unit is provided on said telescope unit and rotatably irradiates said laser beam to the horizontal direction by the rotation of said scanning mirror.

4. The surveying system according to claim 1, wherein a positional relationship between the lower end of said pole and said prism is already known, an electronic distance meter having a same optical axis as the axis of said pole is provided, said arithmetic control module calculates a three-dimensional coordinate of said measuring point based on the measurement result of said prism by said first surveying unit, said measuring point direction vector, the positional relationship between said prism and said electronic distance meter, and the distance measurement result of said electronic distance meter.

5. A surveying system, having a surveying instrument comprising a first surveying unit which projects a distance measuring light and measures a prism, a second surveying unit provided integrally with said first surveying unit, and an arithmetic control module, and a target instrument installed at a measuring point, wherein said first surveying unit comprises a frame in a horizontally rotatable manner, a telescope unit provided on said frame in a vertically rotatable manner, a first angle measuring unit which detects a horizontal angle of said frame and a vertical angle of said telescope unit, and a first distance measuring unit which is accommodated in said telescope unit and measures a distance to said prism, wherein said second surveying unit comprises a scanning mirror which rotatably irradiates a laser beam to one axis in a vertical direction or a horizontal direction and a second angle measuring unit which detects a vertical angle of said scanning mirror, wherein said target instrument comprises a pole, said prism provided on an axis of said pole and has a known positional relationship with a lower end of said pole, and a target plate mounted on said pole, wherein said arithmetic control module scans a laser beam by a cooperative operation of the horizontal rotation of said frame or the vertical rotation of said telescope unit and the vertical rotation or the horizontal rotation of said scanning mirror, acquires point cloud data of said target plate, calculates a measuring point direction vector indicating a tilt direction of said pole based on a measurement result of a surface of said target plate obtained from said point cloud data, and calculates a three-dimensional coordinate of said measuring point based on the three-dimensional coordinate of an optical center of said prism measured by said first measuring unit, said measuring point direction vector, and the positional relationship between the optical center of said prism and the lower end of said pole, wherein said target plate has a triangular prism shape having a triangular lateral cross-section, said prism is provided on a ridge line formed by adjacent two surfaces crossing each other, said arithmetic control module calculates a ridge line vector and a normal vector of each surface based on the measurement result of said two surfaces, calculates an average normal vector based on said each normal vector, and calculates a vector orthogonal to said average normal vector and said ridge line vector, respectively, and passing through the optical center of said prism as said measuring point direction vector.

6. The surveying system according to claim 5, wherein a positional relationship between the lower end of said pole and said prism is already known, an electronic distance meter having a same optical axis as the axis of said pole is provided, said arithmetic control module calculates a three-dimensional coordinate of said measuring point based on the measurement result of said prism by said first surveying unit, said measuring point direction vector, the positional relationship between said prism and said electronic distance meter, and the distance measurement result of said electronic distance meter.

7. The surveying system according to claim 5, wherein said second surveying unit is provided on said frame and rotatably irradiates said laser beam to a vertical direction by the rotation of said scanning mirror.

8. The surveying system according to claim 5, wherein said second surveying unit is provided on said telescope unit and rotatably irradiates said laser beam to the horizontal direction by the rotation of said scanning mirror.

9. A surveying system, having a surveying instrument comprising a first surveying unit which projects a distance measuring light and measures a prism, a second surveying unit provided integrally with said first surveying unit, and an arithmetic control module, and a target instrument installed at a measuring point, wherein said first surveying unit comprises a frame in a horizontally rotatable manner, a telescope unit provided on said frame in a vertically rotatable manner, a first angle measuring unit which detects a horizontal angle of said frame and a vertical angle of said telescope unit, and a first distance measuring unit which is accommodated in said telescope unit and measures a distance to said prism, wherein said second surveying unit comprises a scanning mirror which rotatably irradiates a laser beam to one axis in a vertical direction or a horizontal direction and a second angle measuring unit which detects a vertical angle of said scanning mirror, wherein said target instrument comprises a pole, said prism provided on an axis of said pole and has a known positional relationship with a lower end of said pole, and a target plate mounted on said pole, wherein said arithmetic control module scans a laser beam by a cooperative operation of the horizontal rotation of said frame or the vertical rotation of said telescope unit and the vertical rotation or the horizontal rotation of said scanning mirror, acquires point cloud data of said target plate, calculates a measuring point direction vector indicating a tilt direction of said pole based on a measurement result of a surface of said target plate obtained from said point cloud data, and calculates a three-dimensional coordinate of said measuring point based on the three-dimensional coordinate of an optical center of said prism measured by said first measuring unit, said measuring point direction vector, and the positional relationship between the optical center of said prism and the lower end of said pole, wherein said target plate is two or more plate materials provided at an equal angular interval radially on said pole, said prism is an omnidirectional prism provided on an upper end of said target plate, and said arithmetic control module calculates a ridge line formed by said two surfaces crossing each other based on the measurement results of the adjacent two surfaces of said target plate as said measuring point direction vector.

10. The surveying system according to claim 9, wherein a positional relationship between the lower end of said pole and said prism is already known, an electronic distance meter having a same optical axis as the axis of said pole is provided, said arithmetic control module calculates a three-dimensional coordinate of said measuring point based on the measurement result of said prism by said first surveying unit, said measuring point direction vector, the positional relationship between said prism and said electronic distance meter, and the distance measurement result of said electronic distance meter.

11. The surveying system according to claim 9, wherein said second surveying unit is provided on said frame and rotatably irradiates said laser beam to a vertical direction by the rotation of said scanning mirror.

12. The surveying system according to claim 9, wherein said second surveying unit is provided on said telescope unit and rotatably irradiates said laser beam to the horizontal direction by the rotation of said scanning mirror.

13. A surveying system, having a surveying instrument comprising a first surveying unit which projects a distance measuring light and measures a prism, a second surveying unit provided integrally with said first surveying unit, and an arithmetic control module, and a target instrument installed at a measuring point, wherein said first surveying unit comprises a frame in a horizontally rotatable manner, a telescope unit provided on said frame in a vertically rotatable manner, a first angle measuring unit which detects a horizontal angle of said frame and a vertical angle of said telescope unit, and a first distance measuring unit which is accommodated in said telescope unit and measures a distance to said prism, wherein said second surveying unit comprises a scanning mirror which rotatably irradiates a laser beam to one axis in a vertical direction or a horizontal direction and a second angle measuring unit which detects a vertical angle of said scanning mirror, wherein said target instrument comprises a pole, said prism provided on an axis of said pole and has a known positional relationship with a lower end of said pole, and a target plate mounted on said pole, wherein said arithmetic control module scans a laser beam by a cooperative operation of the horizontal rotation of said frame or the vertical rotation of said telescope unit and the vertical rotation or the horizontal rotation of said scanning mirror, acquires point cloud data of said target plate, calculates a measuring point direction vector indicating a tilt direction of said pole based on a measurement result of a surface of said target plate obtained from said point cloud data, and calculates a three-dimensional coordinate of said measuring point based on the three-dimensional coordinate of an optical center of said prism measured by said first measuring unit, said measuring point direction vector, and the positional relationship between the optical center of said prism and the lower end of said pole, wherein an optical axis of said second surveying unit is offset in a horizontal direction with respect to an optical axis of said first distance measuring unit, said target plate has a triangular prism shape having a triangular lateral cross-section, said prism is provided on a ridge line formed by the adjacent two surfaces crossing each other, said arithmetic control module detects three edges of an upper end and a lower end and the ridge line of said adjacent two surfaces based on one row of point cloud data, detects said adjacent two surfaces based on said three edges and the measurement result of said prism by said first surveying unit, calculates a ridge line vector and a normal vector of each surface based on the measurement result of said adjacent two surfaces, calculates an average normal vector based on said each normal vector, and calculates a vector orthogonal to said average normal vector and said ridge line vector, respectively, and passing through said prism as said measuring point direction vector.

14. The surveying system according to claim 13, wherein a positional relationship between the lower end of said pole and said prism is already known, an electronic distance meter having a same optical axis as the axis of said pole is provided, said arithmetic control module calculates a three-dimensional coordinate of said measuring point based on the measurement result of said prism by said first surveying unit, said measuring point direction vector, the positional relationship between said prism and said electronic distance meter, and the distance measurement result of said electronic distance meter.

15. The surveying system according to claim 13, wherein said second surveying unit is provided on said frame and rotatably irradiates said laser beam to a vertical direction by the rotation of said scanning mirror.

16. The surveying system according to claim 13, wherein said second surveying unit is provided on said telescope unit and rotatably irradiates said laser beam to the horizontal direction by the rotation of said scanning mirror.

\* \* \* \* \*